(12) United States Patent
Ayllón Álvarez et al.

(10) Patent No.: US 11,514,927 B2
(45) Date of Patent: Nov. 29, 2022

(54) SYSTEM AND METHOD FOR MULTICHANNEL SPEECH DETECTION

(71) Applicants: UBTECH NORTH AMERICA RESEARCH AND DEVELOPMENT CENTER CORP, Pasadena, CA (US); UBTECH ROBOTICS CORP LTD, Guangdong (CN)

(72) Inventors: David Ayllón Álvarez, Pasadena, CA (US); Yi Zheng, Guangdong (CN); Huan Tan, Pasadena, CA (US)

(73) Assignee: UBTECH NORTH AMERICA RESEARCH AND DEVELOPMENT CENTER CORP, Shenzhen (CN)

( * ) Notice: Subject to any disclaimer, the term of this patent is extended or adjusted under 35 U.S.C. 154(b) by 76 days.

(21) Appl. No.: 17/232,934

(22) Filed: Apr. 16, 2021

(65) Prior Publication Data

US 2022/0335966 A1 Oct. 20, 2022

(51) Int. Cl.
*G10L 25/78* (2013.01)
*H04S 3/00* (2006.01)
(Continued)

(52) U.S. Cl.
CPC .............. *G10L 25/78* (2013.01); *G06N 3/049* (2013.01); *G06N 3/08* (2013.01); *G10L 15/02* (2013.01);
(Continued)

(58) Field of Classification Search
CPC ........ G06N 3/088; G06N 3/0454; G06N 3/08; G06N 3/0472; G06N 3/0481; G06N 3/049;
(Continued)

(56) References Cited

U.S. PATENT DOCUMENTS

2005/0228649 A1* 10/2005 Harb ....................... G10L 15/00
704/211
2017/0092297 A1 3/2017 Sainath et al.
(Continued)

OTHER PUBLICATIONS

Shaojie Bai et al., An Empirical Evaluation of Generic Convolutional and Recurrent Networks for Sequence Modeling, arXiv:1803.01271v2 [cs.LG] Apr. 19, 2018; (14 pages).

*Primary Examiner* — Yogeshkumar Patel
(74) *Attorney, Agent, or Firm* — Bayes PLLC

(57) ABSTRACT

Embodiments of the disclosure provide systems and methods for speech detection. The method may include receiving a multichannel audio input that includes a set of audio signals from a set of audio channels in an audio detection array. The method may further include processing the multichannel audio input using a neural network classifier to generate a series of classification results in a series of time windows for the multichannel audio input. The neural network classifier includes a causal temporal convolutional network (TCN) configured to determine a classification result for each time window based on portions of the multichannel audio input in the corresponding time window and one or more time windows before the corresponding time window. The method may additionally include determining whether the multichannel audio input includes one or more speech segments in the series of time windows based on the series of classification results.

20 Claims, 17 Drawing Sheets

(51) Int. Cl.
  *H04R 1/40* (2006.01)
  *H04R 3/00* (2006.01)
  *G10L 15/16* (2006.01)
  *G10L 15/02* (2006.01)
  *G10L 25/24* (2013.01)
  *G10L 25/18* (2013.01)
  *G06N 3/04* (2006.01)
  *G06N 3/08* (2006.01)
  *G10L 15/22* (2006.01)

(52) U.S. Cl.
  CPC .............. *G10L 15/16* (2013.01); *G10L 15/22* (2013.01); *G10L 25/18* (2013.01); *G10L 25/24* (2013.01); *H04R 1/406* (2013.01); *H04R 3/005* (2013.01); *H04S 3/008* (2013.01); *H04S 2400/01* (2013.01)

(58) Field of Classification Search
  CPC ...... G06N 3/082; G06F 16/55; G06K 9/6215; G06K 9/6232
  See application file for complete search history.

(56) References Cited

U.S. PATENT DOCUMENTS

| | | | |
|---|---|---|---|
| 2019/0066713 A1* | 2/2019 | Mesgarani | G10L 25/30 |
| 2019/0197401 A1* | 6/2019 | Jaganathan | G06N 3/084 |
| 2020/0118553 A1* | 4/2020 | Li | G10L 15/16 |
| 2022/0044688 A1* | 2/2022 | Perret | G06N 3/049 |

* cited by examiner

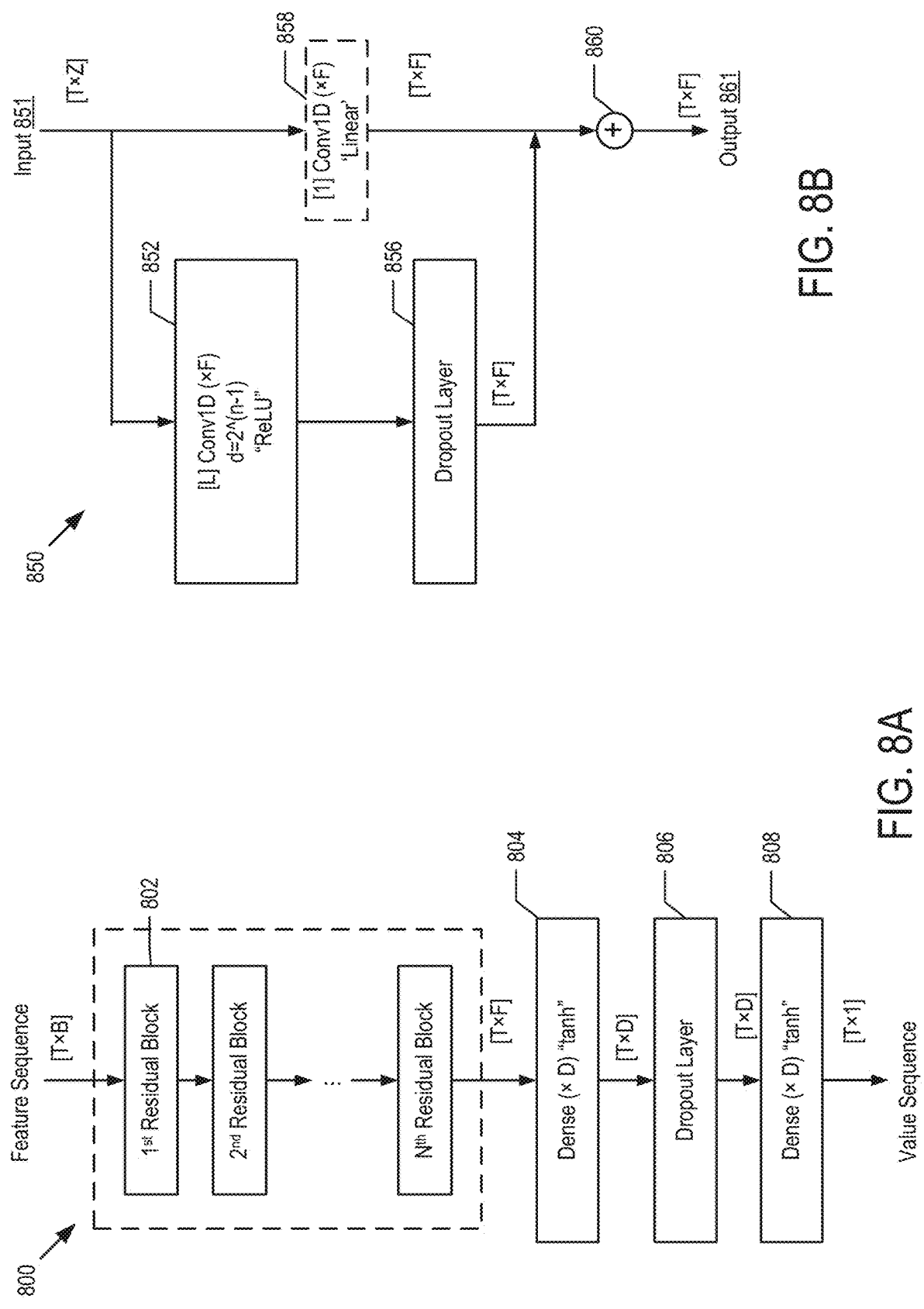

SYSTEM AND METHOD FOR MULTICHANNEL SPEECH DETECTION

TECHNICAL FIELD

The present disclosure relates to the field of speech detection, and more particularly relates to multichannel speech detection using machine learning techniques.

BACKGROUND

An audio signal captured in an environment may include speech segments, non-speech segments, or both. For example, the audio signal may include speech data in a first time duration and non-speech data (e.g., noise data with no speech) in a second time duration. In a low-noise environment with no reverberations, a simple energy detector can be applied to detect the speech data from the audio signal. However, in a real-world environment where the audio signal is corrupted by noise or reverberations, the energy detector may fail to distinguish the speech data from the non-speech data in the audio signal. Thus, a machine learning technique can be used to detect speech data in the audio signal.

Recently, recurrent neural networks (RNNs) have been widely adopted for modeling sequential data. For example, RNNs having a long short-term memory (LSTM) structure and RNNs with gated recurrent units (GRUs) have been successfully applied in sequence-to-label classification problems for text and audio data. However, since the RNNs have a complex network structure with a large number of hyperparameters, a large memory and a long training time may be needed to train the RNNs. Besides, the RNNs suffer from a vanishing gradient problem. For example, in each iteration of a training process, each weight of a RNN receives an update proportional to a partial derivative of an error function with respect to a current weight. However, in some cases a gradient may be vanishingly small, which prevents a respective weight from changing its value. In a worst case, the vanishing gradient problem may completely stop the RNN from further training.

SUMMARY

Embodiments of the disclosure provide a method for speech detection. The exemplary method includes receiving a multichannel audio input that includes a set of audio signals from a set of audio channels in an audio detection array. The exemplary method further includes processing the multichannel audio input using a neural network classifier to generate a series of classification results in a series of time windows for the multichannel audio input. The neural network classifier includes a causal temporal convolutional network (TCN) configured to determine a classification result for each time window based on portions of the multichannel audio input in the corresponding time window and one or more time windows before the corresponding time window. The exemplary method additionally includes determining whether the multichannel audio input includes one or more speech segments in the series of time windows based on the series of classification results.

Embodiments of the disclosure also provide a system for speech detection. The exemplary system includes a memory configured to store a multichannel audio input acquired by an audio detection array. The multichannel audio input includes a set of audio signals from a set of audio channels in the audio detection array. The exemplary system further includes a processor, configured to process the multichannel audio input using a neural network classifier to generate a series of classification results in a series of time windows for the multichannel audio input. The neural network classifier includes a causal TCN configured to determine a classification result for each time window based on portions of the multichannel audio input in the corresponding time window and one or more time windows before the corresponding time window. The processor is also configured to determine whether the multichannel audio input includes one or more speech segments in the series of time windows based on the series of classification results.

Embodiments of the disclosure also provide a non-transitory computer-readable storage medium configured to store instructions which, in response to an execution by a processor, cause the processor to perform a process including receiving a multichannel audio input that includes a set of audio signals from a set of audio channels in an audio detection array. The process further includes processing the multichannel audio input using a neural network classifier to generate a series of classification results in a series of time windows for the multichannel audio input. The neural network classifier includes a causal TCN configured to determine a classification result for each time window based on portions of the multichannel audio input in the corresponding time window and one or more time windows before the corresponding time window. The process additionally includes determining whether the multichannel audio input includes one or more speech segments in the series of time windows based on the series of classification results.

It is to be understood that both the foregoing general description and the following detailed description are exemplary and explanatory only and are not restrictive of the invention, as claimed.

BRIEF DESCRIPTION OF THE DRAWINGS

FIG. 8A is a schematic diagram illustrating an exemplary structure of a causal TCN, according to embodiments of the disclosure.

FIG. 8B is a schematic diagram illustrating an exemplary structure of a residual block in a causal TCN, according to embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Generally, an audio signal with speech data, such as a speech signal, can be considered as a semi-stationary stochastic process. The audio signal can be viewed as stationary during a short period of time (e.g., 20-40 ms). The audio signal can be split into a series of frames using a sliding time window with overlaps. The series of frames can be viewed as a temporal sequence of data where context information from one or more previous frames can be used to analyze a current frame. An analysis of the audio signal can be carried out in a frequency domain by transforming the frames from a time domain to the frequency domain. For example, a classification of the audio signal can be performed in the frequency domain to determine whether the audio signal includes speech data in a series of time windows.

In the disclosure, speech detection techniques such as systems and methods for improved speech detection are provided by applying a robust neural network classifier for real-time or near real-time speech or non-speech classification based on a multichannel audio input. The multichannel audio input can be obtained by an audio detection array in a noisy and reverberant environment. The neural network classifier may include a causal TCN. The causal TCN may use one or more dilated convolutions to add memory capabilities into the network. A receptive field of the causal TCN can be controlled by the number of dilated convolutions and a kernel size. Compared with other neural networks such as the RNNs, the causal TCN has a lower complexity, and can be trained with a faster speed and a lower memory requirement. As a result, the speech detection techniques described herein can be implemented in real time or near real time.

Consistent with the disclosure, the term "near real time" may refer to a processing of data that quickly responds to an event with a slight delay. The slight delay can be a delay of milliseconds (ms), seconds or minutes, etc., depending on various factors such as computing capabilities, available memory space, and a sampling rate of signals, etc. For example, the speech detection techniques described herein can be performed in near real time with a delay of milliseconds.

Figure 1:
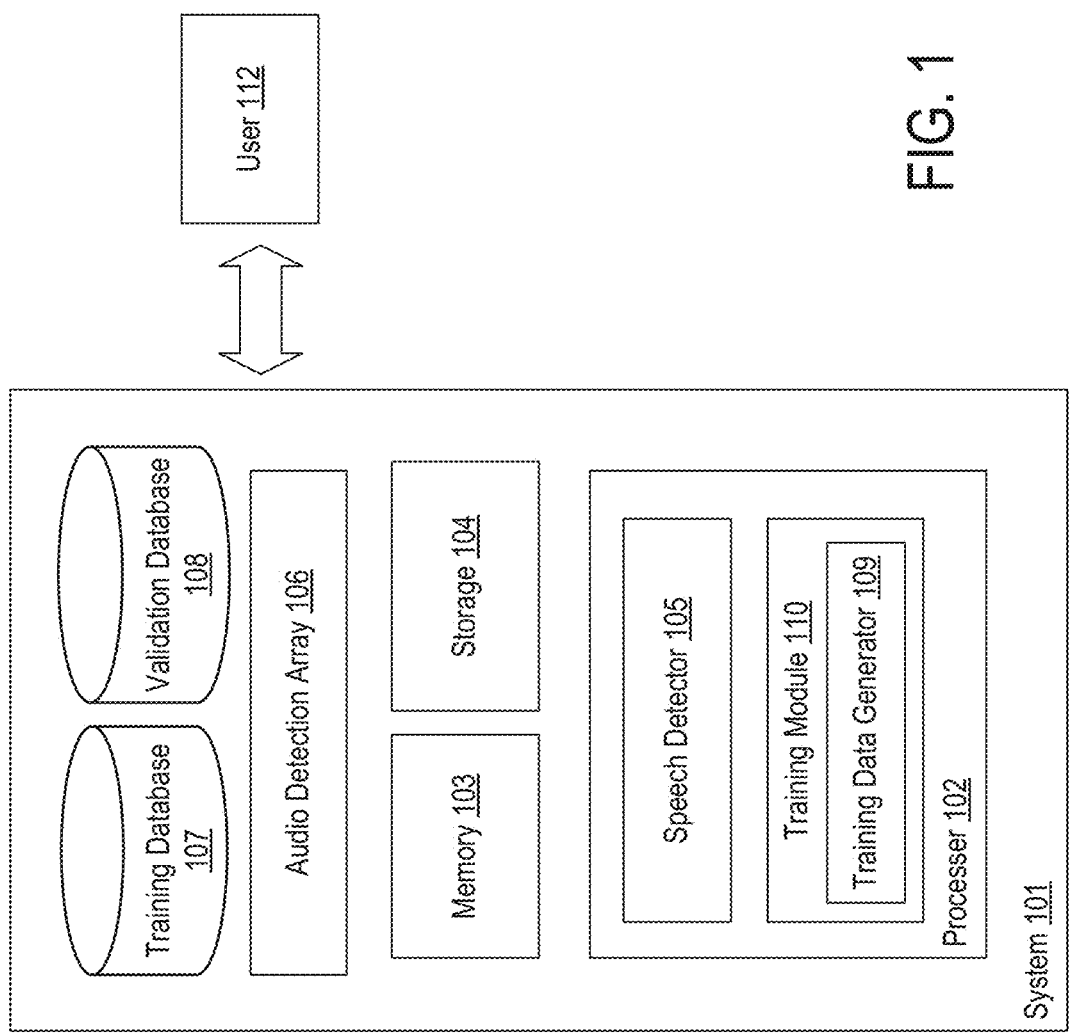
FIG. 1 illustrates a block diagram of an exemplary system for speech detection, according to embodiments of the disclosure.

FIG. 1 illustrates a block diagram 100 of an exemplary system 101 for speech detection, according to embodiments of the disclosure. In some embodiments, system 101 may be embodied on a device that a user 112 can interact with. The device can be, for example, a robot (e.g., a humanoid robot) or any other interactive machine that user 112 can interact with. User 112 may be located in a noisy and reverberant environment and interact with the device using speech, gesture, or any other method. User 112 may be a human being or another robot or device (e.g., a speaker) that can "speak" and send audio signals.

In some embodiments, system 101 and user 112 can be located on a same site. For example, system 101 may be implemented in a local robot, and user 112 can interact with the local robot in a face-to-face manner. Alternatively, user 112 can also interact with the local robot through a local network (not shown).

In some other embodiments, system 101 and user 112 can be located on different sites, and user 112 can interact with system 101 through a network (not shown). For example, system 101 may be implemented in a remote robot on a remote site, while an audio detection array can be located on a same site as user 112 to monitor and record acoustic data from an environment where user 112 is present. For example, the audio detection array can be a microphone array installed in a user device operated by user 112. The audio detection array can provide the recorded acoustic data to system 101 through a network so that user 112 can interact with the remote robot.

In some embodiments, system 101 may include at least one processor, such as a processor 102, at least one memory, such as a memory 103, and at least one storage, such as a storage 104. System 101 may also include at least one audio detection array, such as an audio detection array 106. In some embodiments, system 101 may also include one or more databases (e.g., a training database 107, a validation database 108, etc.). Training database 107 and validation database 108 can be used to train a neural network classifier. System 101 may also include one or more buffers (e.g., a feature buffer 208, a value buffer 209 shown in FIGS. 2A-2B) for data storage. It is understood that system 101 may also include any other suitable components for performing functions described herein.

In some embodiments, system 101 may have different modules in a single device, such as an integrated circuit (IC) chip, or separate devices with dedicated functions. For example, the IC may be implemented as an application-specific integrated circuit (ASIC) or a field-programmable gate array (FPGA). In some embodiments, one or more components of system 101 may be located in a cloud computing environment or may be alternatively in a single location (such as inside a robot) or distributed locations. Components of system 101 may be in an integrated device or distributed at different locations but communicate with each other through a network. For example, audio detection array 106 may or may not be at a same location as system 101. If audio detection array 106 is at a location different from that of system 101, audio detection array 106 can be coupled to system 101 via a network.

Processor 102 may include any appropriate type of general-purpose or special-purpose microprocessor, digital signal processor, graphics processing unit (GPU), or microcontroller. Processor 102 may include one or more hardware units (e.g., portion(s) of an integrated circuit) designed for use with other components or to execute part of a program. The program may be stored on a computer-readable medium, and when executed by processor 102, it may perform one or more functions. Processor 102 may be configured as a separate processor module dedicated to speech detection. Alternatively, processor 102 may be configured as a shared processor module for performing other functions unrelated to speech detection.

Processor 102 may include several modules, such as a training module 110 and a speech detector 105. In some embodiments, training module 110 may include a training data generator 109. Although FIG. 1 shows training module 110 and speech detector 105 within one processor 102, they may be more likely implemented on different processors located closely or remotely with each other. For example, training module 110 may be implemented by a processor dedicated to off-line training (e.g., one or more GPUs), and speech detector 105 may be implemented by another processor for near real time detection.

Training module 110 and speech detector 105 (and any corresponding sub-modules or sub-units) can be hardware units (e.g., portions of an integrated circuit) of processor 102 designed for use with other components or software units implemented by processor 102 through executing at least part of a program. The program may be stored on a computer-readable medium, such as memory 103 or storage 104, and when executed by processor 102, it may perform one or more functions.

In some embodiments, speech detector 105 can be configured to receive a multichannel audio input from audio detection array 106. Speech detector 105 may process the multichannel audio input using a neural network classifier to determine whether the multichannel audio input includes one or more speech segments. For example, speech detector 105 can process the multichannel audio input using a neural network classifier to generate a series of classification results in a series of time windows for the multichannel audio input. Speech detector 105 can determine whether the multichannel audio input includes one or more speech segments in the series of time windows based on the series of classification results. Speech detector 105 is described below in more detail with reference to FIGS. 2A-9.

In some embodiments, the neural network classifier may include a causal TCN, configured to determine a classification result for each time window based on portions of the multichannel audio input in the corresponding time window and one or more time windows before the corresponding time window. An exemplary structure of the causal TCN is illustrated with reference to FIGS. 8A-8B.

In some embodiments, training module 110 can be configured to train the neural network classifier. For example, training data generator 109 can be configured to generate training data, so that training module 110 can use the training data to train the neural network classifier before speech detector 105 applies the neural network classifier for speech detection. Training module 110 and training data generator 109 are described below in more detail with reference to FIGS. 10-12.

Memory 103 and storage 104 may include any appropriate type of mass storage provided to store any type of information that processor 102 may need to operate. For example, memory 103 and storage 104 may be a volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 103 and/or storage 104 may be configured to store one or more computer programs that may be executed by processor 102 to perform functions disclosed herein. For example, memory 103 and/or storage 104 may be configured to store program(s) that may be executed by processor 102 to perform speech detection on audio signals. Memory 103 and/or storage 104 may be further configured to store information and data used by processor 102.

Audio detection array 106 may include a set of audio detection devices configured for recording an acoustic signal in an environment where user 112 is present. The set of audio detection devices may include one or more audio detection devices such as one or more microphones. The set of audio detection devices can be aligned in a same line, or arranged in a rectangular array, a circular array or any other suitable form. For example, the set of audio detection devices can include 4 microphones that form a circular microphone array assembled on a head of a humanoid robot.

In some embodiments, the set of audio detection devices can generate a set of audio signals from a set of channels, respectively. The set of audio signals can form a multichannel audio input for speech detector 105. For example, each audio detection device can record an acoustic signal in the environment in a channel, and generate an audio signal according to the recorded acoustic signal. If user 112 speaks in the environment, the audio signal may include speech data. In some cases, the audio signal may be corrupted by one or more of noise, echoes, or reverberations in the environment. Due to various factors such as different orientations of the audio detection devices and different noise levels at the audio detection devices, the audio detection devices may generate different audio signals for the same environment.

Training database 107 can be configured to store training data for training a neural network classifier. For example, training database 107 may store one or more training datasets. In another example, training database 107 may store audio signals generated from a method 1200 shown in FIG. 12. Training database 107 is described below in more detail with reference to FIGS. 10-12.

Validation database 108 can be configured to store validation data for validating a training of the neural network classifier. For example, validation database 108 may store one or more validation datasets.

In some embodiments, training module 110, training database 107 and validation database 108 can be implemented in another system that includes a GPU, and the other system can be separate from system 101. Then, the other system including the GPU can be dedicated for off-line training of the neural network classifier, and system 101 including speech detector 105 can be used for speech detection.

Figure 2A:
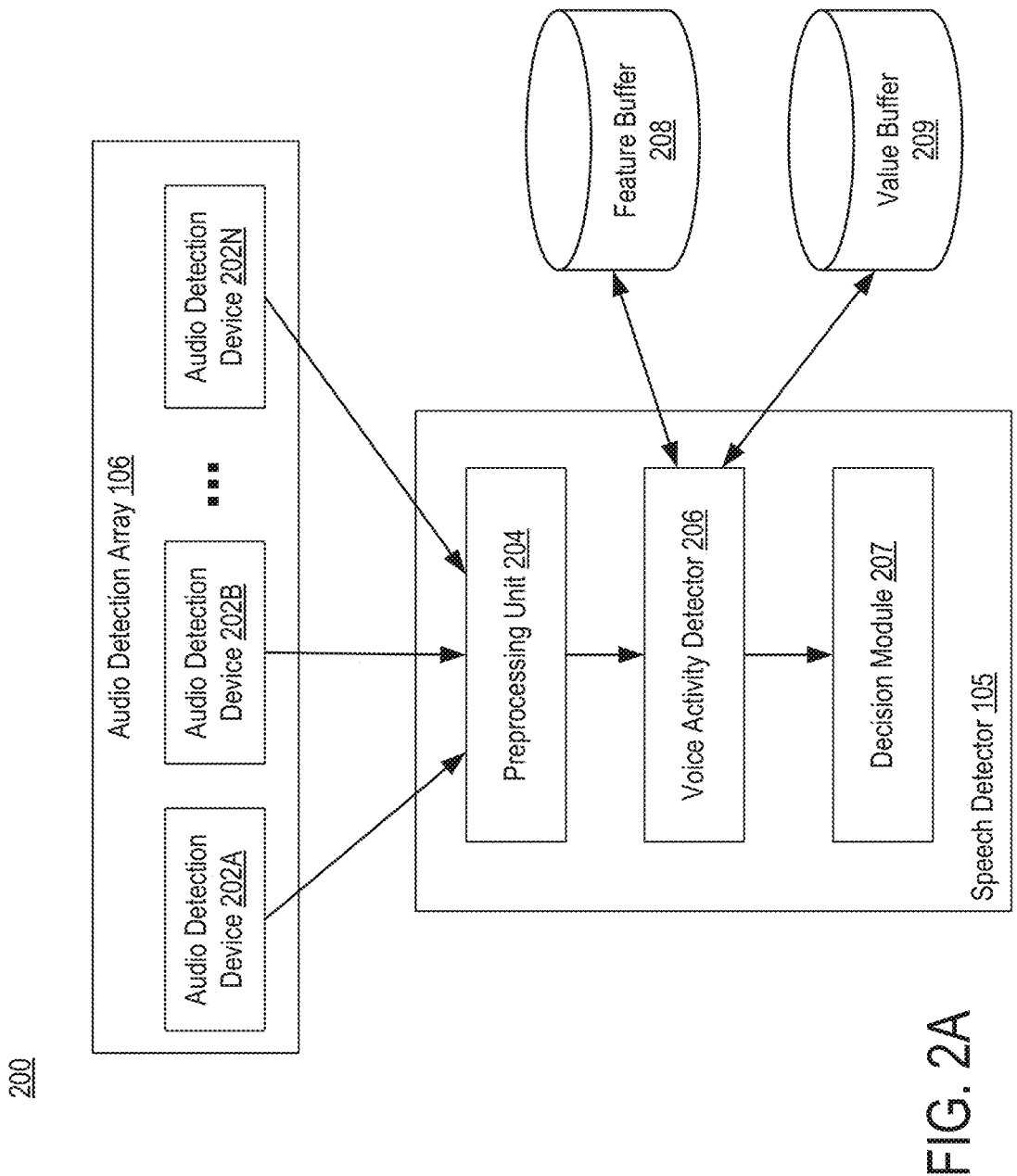
FIG. 2A illustrates a block diagram of an exemplary structure of a speech detector coupled with an audio detection array, according to embodiments of the disclosure.

FIG. 2A illustrates a block diagram 200 of an exemplary structure of speech detector 105 coupled with audio detection array 106, according to embodiments of the disclosure. Audio detection array 106 may include a set of audio detection devices 202A, 202B, . . . , 202N (also referred to as audio detection device 202, individually or collectively). Speech detector 105 may include a preprocessing unit 204, a voice activity detector 206 and a decision module 207. In some embodiments, preprocessing unit 204 can be a component of audio detection array 106 and integrated into audio detection array 106. Voice activity detector 206 may be coupled to one or more storage devices of system 101, such as feature buffer 208 and value buffer 209.

In some embodiments, each audio detection device 202 may capture an acoustic signal in an environment where user 112 is present. Each audio detection device 202 may generate an audio signal based on the captured acoustic signal and provide the audio signal to preprocessing unit 204. As a result, preprocessing unit 204 may receive a set of audio signals from the set of audio detection devices 202. Preprocessing unit 204 may be configured to process the set of audio signals to output a combined audio signal. The combined audio signal may include a combination of acoustic information captured by the set of audio detection devices 202. For example, preprocessing unit 204 may include a spatial filter or a beamformer configured to filter the set of audio signals to output the combined audio signal. The spatial filter or the beamformer may point at an estimated direction of arrival of the acoustic signal.

In some embodiments, voice activity detector 206 may be configured to process the combined audio signal using a neural network classifier to generate a series of classification results in a series of time windows for the combined audio signal, as described below in more detail. Each time window may have a predetermined time duration, and may or may not overlap with adjacent time windows. For example, each time window may have a length of 16 ms and an overlap of 8 ms with adjacent time windows (e.g., an overlap of 4 ms with a previous time window, and an overlap of 4 ms with a following time window).

Specifically, voice activity detector 206 may divide the combined audio signal into a series of frames in the series of time windows. For example, voice activity detector 206 may generate a respective frame for each time window from the combined audio signal, so that a series of frames can be generated for the series of time windows. Here, the series of frames from the combined audio signals may have a one-to-one correspondence with the series of time windows. Each frame may include a segment of the combined audio signal in the corresponding time window, and may have an overlap with adjacent frames using a raised-cosine window. For example, each frame may include a segment of the combined audio signal with a length of 16 ms, and may have an overlap of 8 ms with adjacent frames using a raised-cosine window. In some embodiments, a sampling rate for the set of audio signals (or the combined audio signal) can be 16 kHz. As a result, a total number of samples in each frame with a length of 16 ms can be 16 ms' 16 kHz=256.

Next, for each time window, voice activity detector 206 may obtain, from the series of frames, a frame that corresponds to the corresponding time window and generate a feature sequence for the frame. The feature sequence may include a feature for the frame and T–1 features for T–1 previous frames, where T is a positive integer. In some embodiments, the feature for the frame can include a Mel-frequency spectrum of the frame.

For example, voice activity detector 206 may process the frame using a high-pass filter to remove a direct current (DC) offset and low-frequency noise. Voice activity detector 206 may compute a Mel-frequency spectrum for the frame. Voice activity detector 206 may also compute T–1 Mel-frequency spectra of the T–1 previous frames. Alternatively, voice activity detector 206 may retrieve the T–1 Mel-frequency spectra of the T–1 previous frames from feature buffer 208. Then, voice activity detector 206 may concatenate the Mel-frequency spectrum of the frame with the T–1 Mel-frequency spectra of the T–1 previous frames to generate the feature sequence. A method for computing the Mel-frequency spectrum is illustrated below with reference to FIG. 7A. Voice activity detector 206 may store the feature sequence for the frame in feature buffer 208. In some embodiments, feature buffer 208 may be configured to store a series of features for the series of frames, so that a feature sequence for each frame can be formed using the stored features.

For each time window, voice activity detector 206 may input a feature sequence of the corresponding frame to the neural network classifier to produce a value sequence for the corresponding frame. The value sequence may include a value estimation for the corresponding frame and T–1 value estimations for T–1 previous frames. Voice activity detector 206 may update value buffer 209 based on the value sequence.

Figure 9:
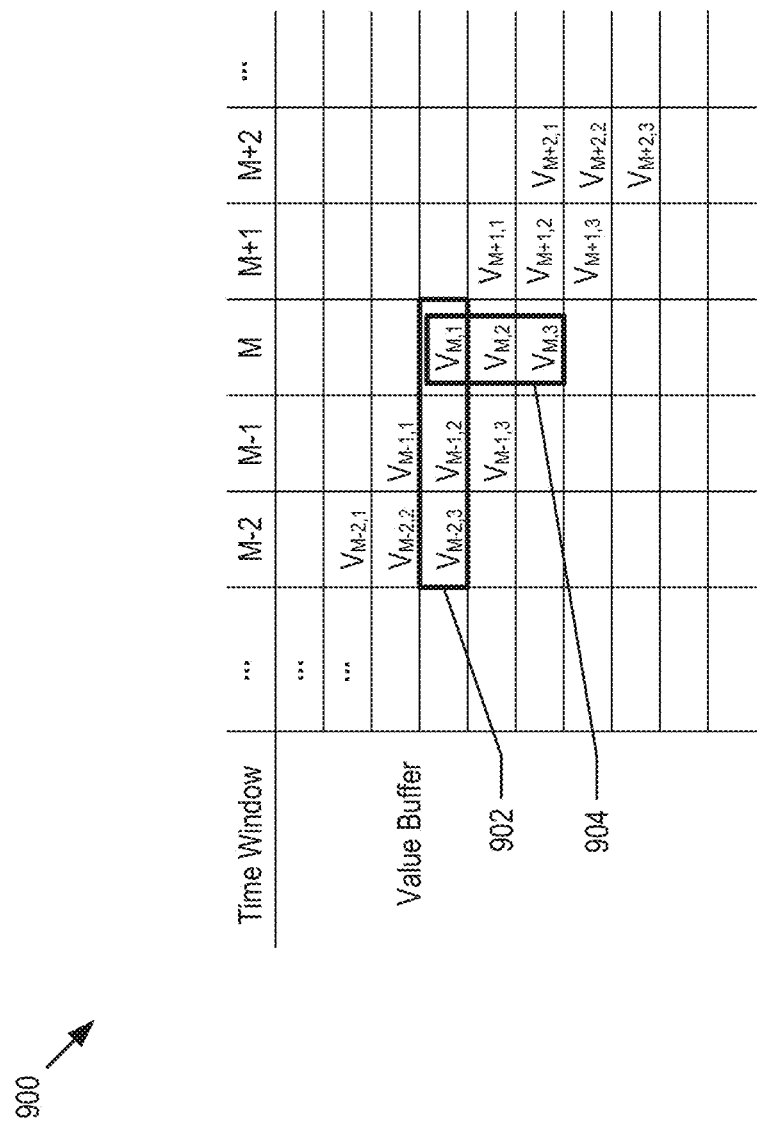
FIG. 9 is a schematic diagram illustrating an exemplary value buffer, according to embodiments of the disclosure.

Value buffer 209 may be configured to store value estimations for each frame. In some embodiments, value buffer 209 may store a value sequence for each frame. A value estimation for a frame may include a value representing, for example, a probability that the frame includes speech data. In some embodiments, multiple value estimations can be generated and stored for each frame, as shown in FIG. 9 which is described below in more detail.

For each time window, voice activity detector 206 may also generate an estimation result for the corresponding time window based on value buffer 209. For example, voice activity detector 206 may generate the estimation result for the corresponding time window based on one or more value estimations of the frame stored in value buffer 209. In a further example, the estimation result can be an average, a maximum, a minimum, or a median of values in the one or more value estimations. An exemplary approach to generate an estimation result from one or more value estimations is illustrated below with reference to FIG. 9.

For each time window, decision module 207 may be configured to determine a classification result for the corresponding time window based on the estimation result of the corresponding time window. For example, decision module 207 may compare the estimation result with a predetermined threshold (e.g., 0.5 or any other suitable value) and determine the signal in the corresponding time window is a speech if the estimation result is not less than the threshold ("a speech classification result"). If the estimation result is less than the threshold, decision module 207 determines the signal in the corresponding time window is a non-speech ("a non-speech classification result"). The classification result can be one of a speech classification result (e.g., a value of "1" indicating that speech data exists in the corresponding time window) or a non-speech classification result (e.g., a value of "0" indicating that no speech data exists in the corresponding time window).

As a result, a series of classification results can be generated for the series of time windows from the multi-channel audio input, with each time window having a classification result (equivalently, with each frame from the combined audio signal having a classification result). Decision module 207 may be further configured to determine whether the multichannel audio input includes one or more speech segments in the series of time windows based on the series of classification results. Specifically, for each time window, decision module 207 may determine whether a speech segment exists in the corresponding time window based on a classification result for the corresponding time window. For example, if the classification result is a speech classification result (e.g., "1"), decision module 207 determines that the multichannel audio input includes speech data in the corresponding time window. If the classification result is a non-speech classification result (e.g., "0"), decision module 207 determines that the multichannel audio input does not include speech data in the corresponding time window.

Figure 2B:
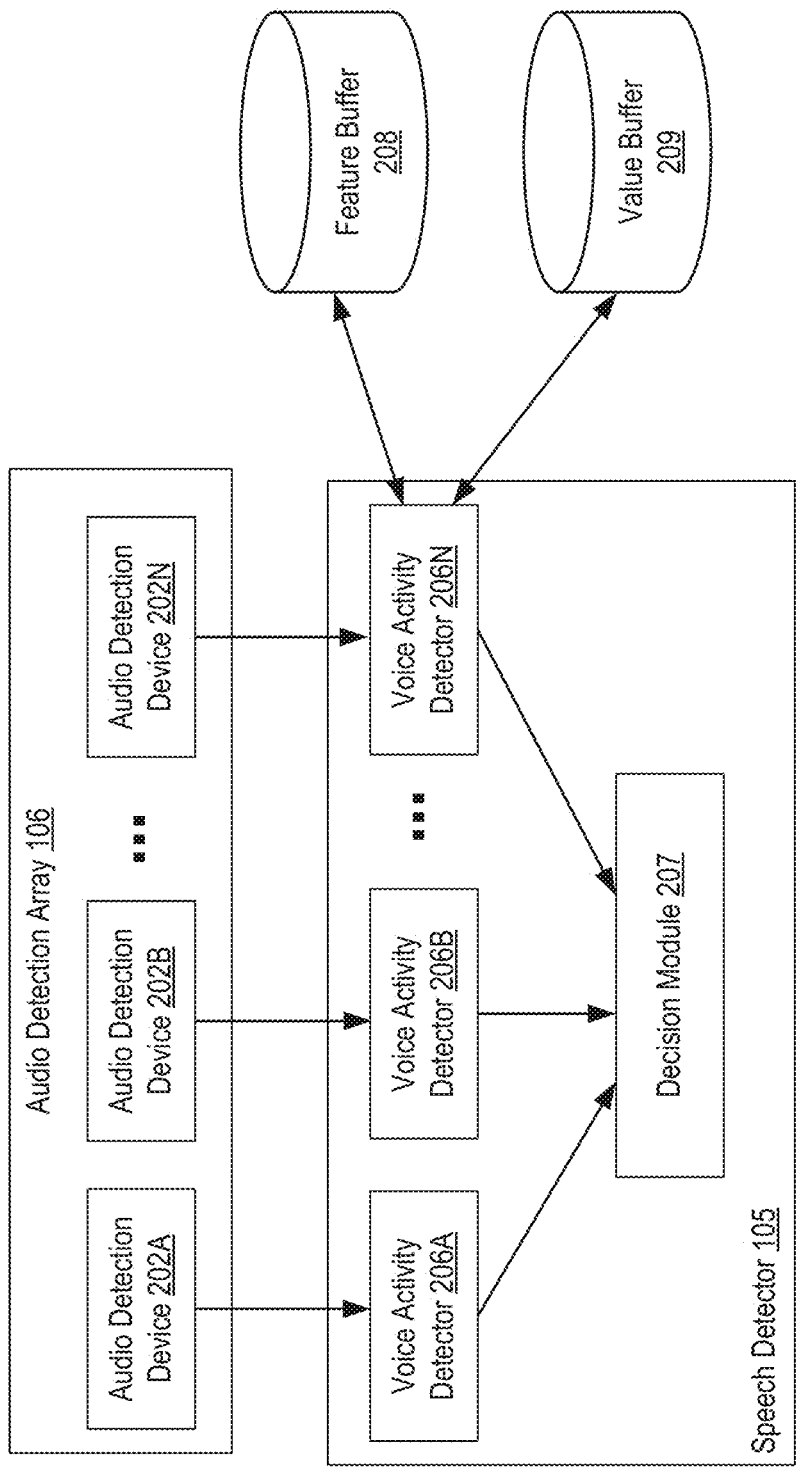
FIG. 2B illustrates a block diagram of another exemplary structure of a speech detector coupled with an audio detection array, according to embodiments of the disclosure.

FIG. 2B illustrates a block diagram 250 of another exemplary structure of speech detector 105 coupled with audio detection array 106, according to embodiments of the disclosure. Speech detector 105 may include decision module 207 and a set of voice activity detectors 206A, 206B, ..., 206N (also referred to as voice activity detector 206, collectively or individually). Each voice activity detector 206 may be coupled to feature buffer 208 and value buffer 209.

In some embodiments, each audio detection device 202 may capture an acoustic signal in an environment where user 112 is present, and may generate an audio signal based on the captured acoustic signal. As a result, the set of audio detection devices 202 may provide a set of audio signals to speech detector 105. Each voice activity detector 206 in speech detector 105 may receive a corresponding audio signal and process the corresponding audio signal using a neural network classifier to make a speech estimation for the corresponding audio signal, as described below in more detail.

Specifically, voice activity detector 206 may divide the corresponding audio signal into a series of frames in a series of time windows. For example, voice activity detector 206 may generate a frame for each time window from the corresponding audio signal, so that a series of frames can be generated for the series of time windows. Each frame may include a segment of the audio signal during the corresponding time window, and may have an overlap with adjacent frames using a raised-cosine window.

Next, for each time window, voice activity detector 206 may obtain, from the series of frames for the corresponding audio signal, a frame that corresponds to the corresponding time window and generate a feature sequence for the frame. Voice activity detector 206 may store the feature sequence in feature buffer 208. Voice activity detector 206 may input the feature sequence of the frame to the neural network classifier to produce a value sequence, and update value buffer 209 based on the value sequence. Voice activity detector 206 may generate an estimation result for the corresponding time window based on value buffer 209. As a result, the speech estimation generated by voice activity detector 206 may include, for example, a series of estimation results for the series of time windows, with one estimation result for one time window.

By performing operations similar to those described above, the set of voice activity detectors 206 can generate a set of speech estimations for the set of audio signals, respectively. The set of speech estimations may include, for each time window, a corresponding set of estimation results for the set of audio signals. Or, a single voice activity detector 206 may be applied multiple times to process the set of audio signals one by one to generate the set of speech estimations.

For example, assume that there are K voice activity detectors 206 for processing K audio signals, where K is a positive integer. The series of time windows includes W time windows TW(1), TW(2), ..., and TW(W), where W is a positive integer. For an audio signal S(k) with $1 \leq k \leq K$, voice activity detector 206$k$ generates a speech estimation E(k) that includes W estimation results for the W time windows. For example, the W estimation results for the audio signal S(k) are $ER_k(1)$, $ER_k(2)$, ..., and $ER_k(W)$, with a first estimation result $ER_k(1)$ for a first time window TW(1), a second estimation result $ER_k(2)$ for a second time window TW(2), so on and so forth. The following Table 1 illustrates the estimation results for the W time windows based on the K audio signals.

TABLE 1

|  | Time Window TW(1) | Time Window TW(2) | ... | Time Window TW(W) |
|---|---|---|---|---|
| Speech Estimation E(1) for Audio Signal S(1) | $ER_1(1)$ | $ER_1(2)$ | ... | $ER_1(W)$ |
| Speech Estimation E(2) for Audio Signal S(2) | $ER_2(1)$ | $ER_2(2)$ | ... | $ER_2(W)$ |
| ... | ... | ... | ... | ... |
| Speech Estimation E(K) for Audio Signal S(K) | $ER_K(1)$ | $ER_K(2)$ | ... | $ER_K(W)$ |

It can be seen from each row of Table 1 that each speech estimation E(k) includes a series of estimation results ($ER_k(1)$, $ER_k(2)$, ..., and $ER_k(W)$) for the series of time windows (TW(1), TW(2), ..., and TW(W)). It can also be seen from each column of Table 1 that, for each time window TW(w) with $1 \leq w \leq W$, the set of speech estimations (E(1), E(2), ..., and E(K)) may include a corresponding set of estimation results (e.g., K estimation results including $ER_1(w)$, $ER_2(w)$, ..., and $ER_K(w)$ for the time window TW(w)).

Decision module 207 may be configured to fuse the set of speech estimations for the set of audio signals to generate a series of classification results in the series of time windows for the multichannel audio input. Specifically, for each time window, decision module 207 may fuse the corresponding set of estimation results to generate a classification result for the corresponding time window, as described below in more details.

In some embodiments, for each time window, decision module 207 may determine a fused estimation result from the corresponding set of estimation results. The fused estimation result can be, for example, a maximum, a minimum, an average or another statistical permutation of the corresponding set of estimation results. For example, based on the above Table 1, a fused estimation result for a time window TW(w) can be a maximum, a minimum or an average of K estimation results ($ER_1(w)$, $ER_2(w)$, ..., and $ER_K(w)$) for the time window TW(w). Then, decision module 207 may determine a classification result based on the fused estimation result. For example, for each time window, decision module 207 may compare the fused estimation result with a predetermined threshold (e.g., 0.5) and determine a speech classification result (e.g., "1") for the corresponding time window if the fused estimation result is not less than the predetermined threshold. If the fused estimation result is less than the predetermined threshold, decision module 207 determines a non-speech classification result (e.g., "0") for the corresponding time window.

In some embodiments, for each time window, decision module 207 may determine a set of preliminary classification results based on the corresponding set of estimation results. Then, decision module 207 may determine a classification result for the corresponding time window based on the set of preliminary classification results.

For example, for each time window TW(w), decision module 207 may compare each estimation result in the corresponding set of estimation results ($ER_1(w)$, $ER_2(w)$, ..., and $ER_K(w)$) with a predetermined threshold to determine a preliminary classification result for the corresponding time window. If the estimation result is not less than the predetermined threshold, a speech classification result ("1") is generated as a preliminary classification result; otherwise, a non-speech classification result (e.g., "0") is generated as a preliminary classification result. As a result, a set of preliminary classification results is generated based on the corresponding set of estimation results ($ER_1(w)$, $ER_2(w)$, ..., and $ER_K(w)$). Next, if any of the preliminary classification results is a speech classification result ("1"), decision module 207 may determine a speech classification result ("1") for the corresponding time window. If none of the preliminary classification results is a speech classification result ("1"), decision module 207 may determine a non-speech classification result ("0") for the corresponding time window.

By performing similar operations, decision module 207 may generate a series of classification results for the series of time windows, with each time window having a classification result. Decision module 207 may be configured to determine whether the multichannel audio input from audio detection array 106 includes one or more speech segments in the series of time windows based on the series of classification results. For example, for each time window, if a classification result for the corresponding window is a speech classification result (e.g., "1"), decision module 207 determines that the multichannel audio input includes speech data in the corresponding time window. If the classification result is a non-speech classification result (e.g., "0"), decision module 207 determines that the multichannel audio input does not include speech data in the corresponding time window.

Consistent with FIGS. 2A-2B, audio detection array 106 can be configured to detect a set of audio signals as different representations of a same underlying acoustic signal. The set of audio signals may form a multichannel audio input for the speech detection techniques described herein. The multichannel audio input can capture information of the acoustic signal from different directions, and is more resilient to noise and reverberations comparing to a case where the acoustic signal is captured in a single direction. As a result, a speech-detection accuracy of the speech detection techniques described herein can be improved based on the multichannel audio input.

Figure 3:
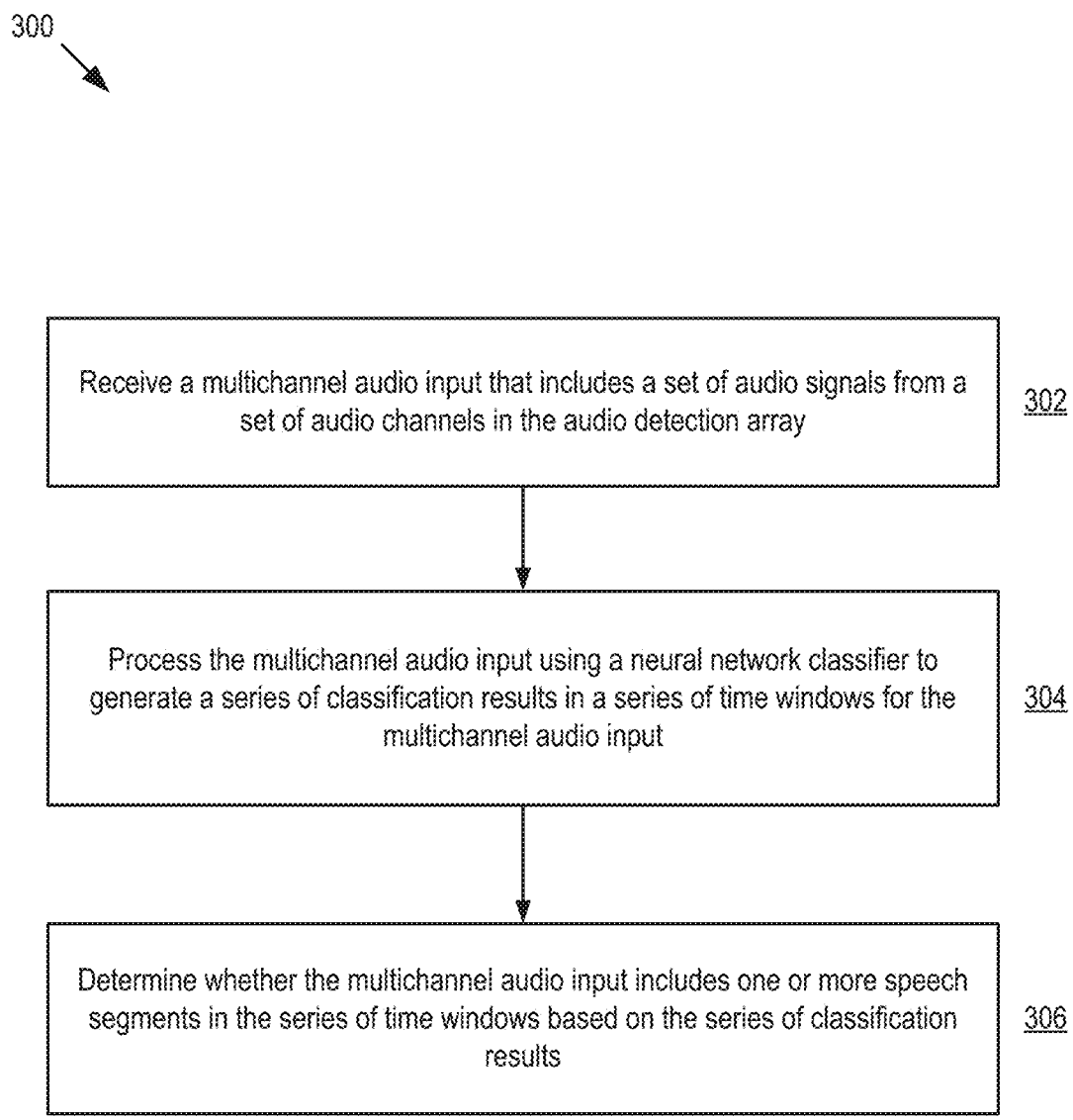
FIG. 3 is a flow chart of an exemplary method of speech detection, according to embodiments of the disclosure.

FIG. 3 is a flow chart of an exemplary method 300 of speech detection, according to embodiments of the disclosure. Method 300 may be implemented by system 101, specifically speech detector 105, and may include steps 302-306 as described below. Some of the steps may be optional to perform the disclosure provided herein. Further, some of the steps may be performed simultaneously, or in a different order than shown in FIG. 3.

In step 302, speech detector 105 receives a multichannel audio input that includes a set of audio signals from a set of audio channels in audio detection array 106.

In step 304, speech detector 105 processes the multichannel audio input using a neural network classifier to generate a series of classification results in a series of time windows for the multichannel audio input. In some embodiments, the neural network classifier may include a causal TCN configured to determine a classification result for each time window based on portions of the multichannel audio input in the corresponding time window and one or more time windows before the corresponding time window.

Figure 4:
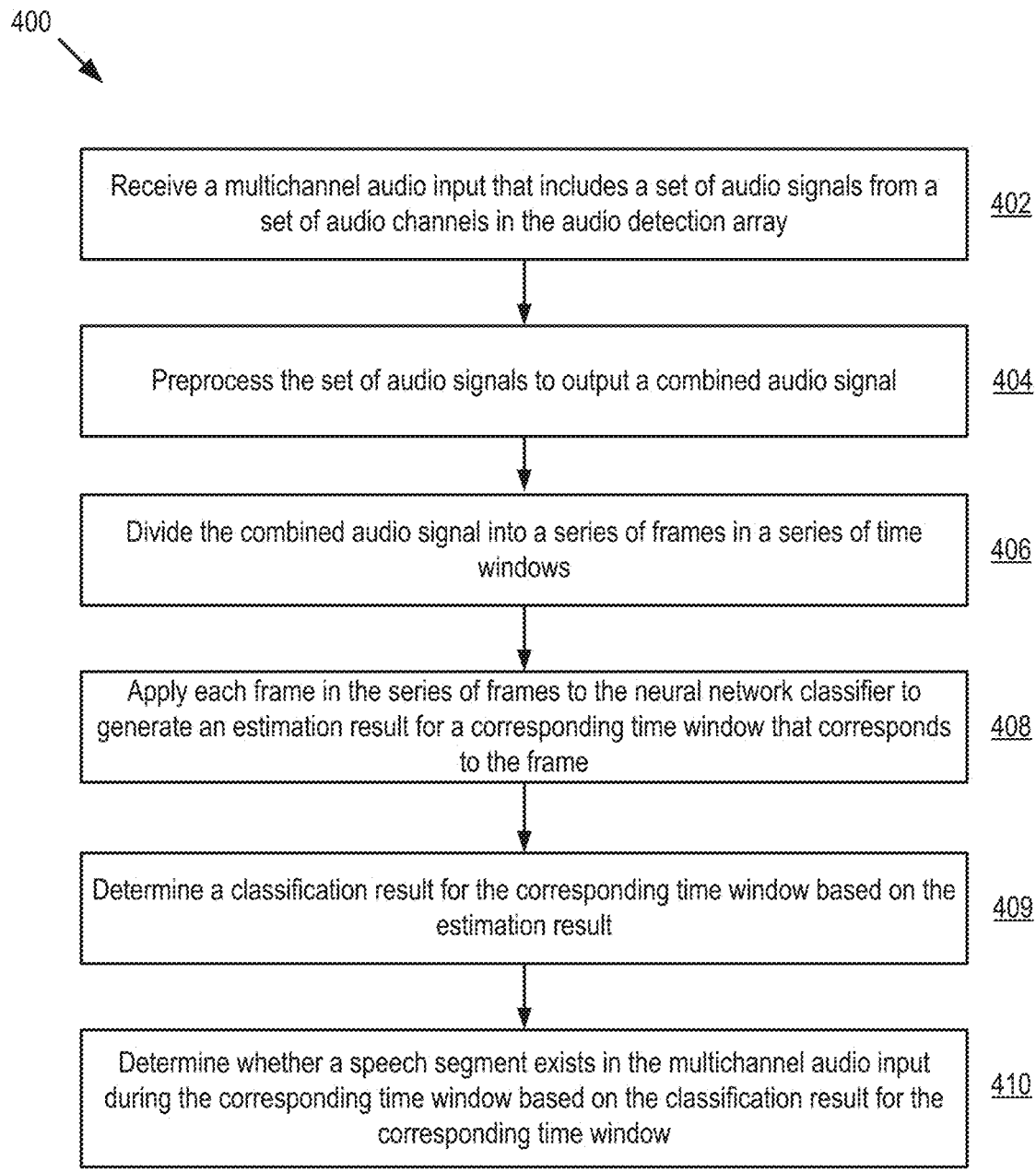
FIG. 4 is a flow chart of another exemplary method for speech detection, according to embodiments of the disclosure.

In some embodiments, speech detector 105 may perform steps 404-409 of FIG. 4 to generate a classification result for each time window. Steps 404-409 are described below with reference to FIG. 4. In some embodiments, speech detector 105 may perform steps 504-506 of FIG. 5 to generate a classification result for each time window. Steps 504-506 are described below with reference to FIG. 5. In some embodiments, speech detector 105 may perform steps 604-618 of FIG. 6 to generate a classification result for each time window. Steps 604-618 are described below with reference to FIG. 6.

In step 306, speech detector 105 determines whether the multichannel audio input includes one or more speech segments in the series of time windows based on the series of classification results. For example, speech detector 105 determines, for each time window, whether a speech segment exists in the multichannel audio input during the corresponding time window based on a classification result for the corresponding time window.

FIG. 4 is a flow chart of another exemplary method 400 for speech detection, according to embodiments of the disclosure. Method 400 may be implemented by system 101, specifically speech detector 105 (e.g., preprocessing unit 204, voice activity detector 206 and decision module 207 of speech detector 105 shown in FIG. 2A), and may include steps 402-410 as described below. In some embodiments, steps 404-409 may be performed to implement step 304 in FIG. 3. Some of the steps may be optional to perform the disclosure provided herein. Further, some of the steps may be performed simultaneously, or in a different order than shown in FIG. 4.

In step 402, preprocessing unit 204 receives a multichannel audio input that includes a set of audio signals from a set of audio channels in audio detection array 106.

In step 404, preprocessing unit 204 preprocesses the set of audio signals to output a combined audio signal. For example, preprocessing unit 204 may include a spatial filter or a beamformer to filer the set of audio signals and generate the combined audio signal as an output.

In step 406, voice activity detector 206 divides the combined audio signal into a series of frames in a series of time windows. For example, voice activity detector 206 may generate a frame for each time window from the combined audio signal, so that a series of frames can be generated for the series of time windows. Each frame may include a segment of the combined audio signal in the corresponding time window and have an overlap with adjacent frames using a raised-cosine window.

In step 408, voice activity detector 206 applies each frame in the series of frames to a neural network classifier to generate an estimation result for a corresponding time window that corresponds to the frame.

Specifically, voice activity detector 206 may generate a feature sequence for the frame. For example, voice activity detector 206 may perform steps 606-610 of FIG. 6 described below to generate a feature sequence for the frame. Next, voice activity detector 206 may input the feature sequence to the neural network classifier to produce a value sequence. The value sequence may include a value estimation for the frame and (T–1) value estimations for the (T–1) previous frames. Value buffer 209 may be updated based on the value sequence. Voice activity detector 206 may generate the estimation result for the corresponding time window based on value buffer 209. For example, voice activity detector 206 may generate the estimation result for the corresponding time window as an average, a maximum, a minimum, or a median of values in multiple value estimations of the frame stored in value buffer 209. In another example, voice activity detector 206 may select a value from the multiple value estimations as the estimation result for the corresponding time window.

In step 409, decision module 207 determines a classification result for the corresponding time window based on the estimation result. For example, decision module 207 may compare the estimation result with a predetermined threshold and determine a speech classification result (e.g., "1") for the corresponding time window if the estimation result is not less than the predetermined threshold. If the estimation result is less than the predetermined threshold, decision module 207 determines a non-speech classification result (e.g., "0") for the corresponding time window.

In step 410, decision module 207 determines whether a speech segment exists in the multichannel audio input during the corresponding time window based on the classification result for the corresponding time window. For example, if the classification result is a speech classification result (e.g., "1"), decision module 207 determines that the multichannel audio input includes speech data in the corresponding time window. If the classification result is a non-speech classification result (e.g., "0"), decision module 207 determines that the multichannel audio input does not include speech data in the corresponding time window.

Figure 5:
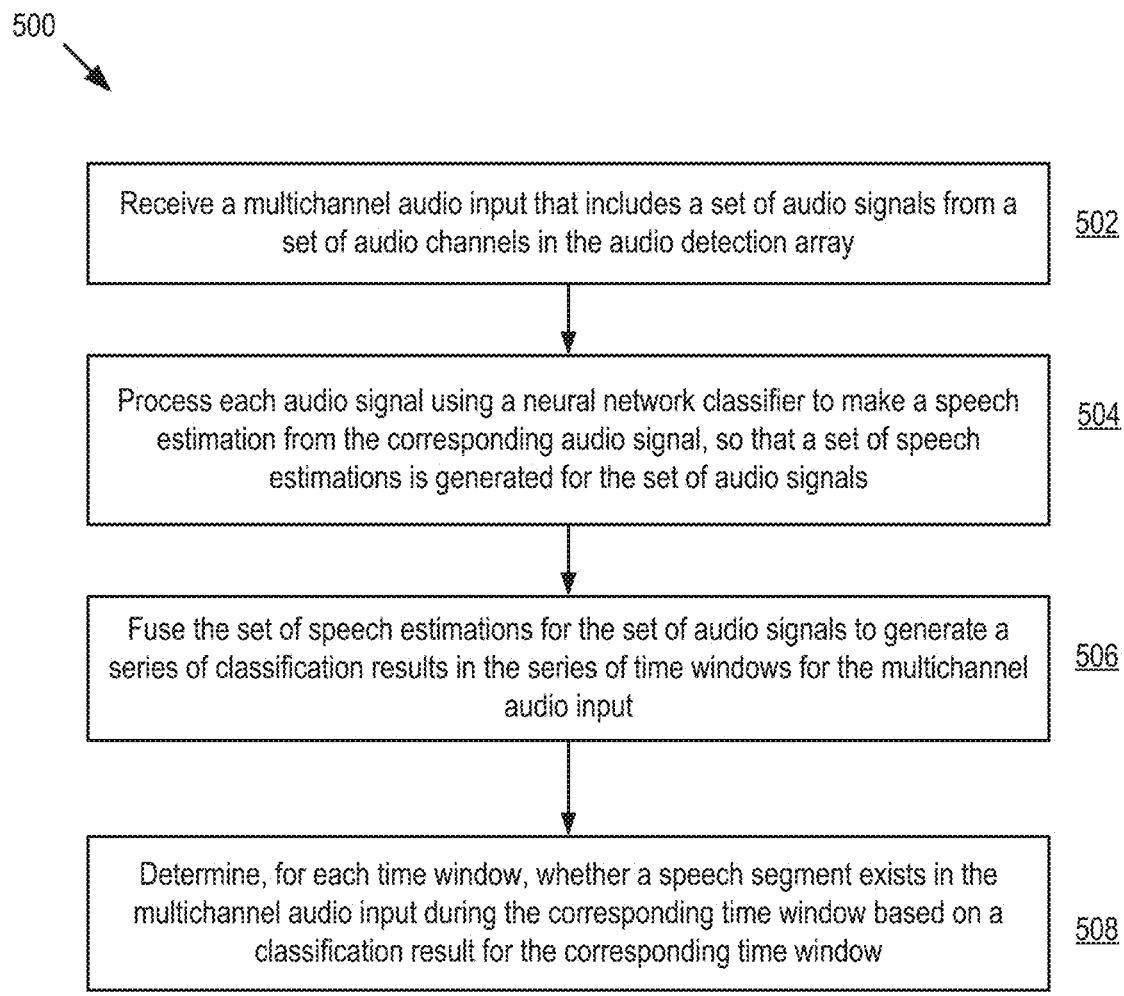
FIG. 5 is a flow chart of yet another exemplary method for speech detection, according to embodiments of the disclosure.

FIG. 5 is a flow chart of yet another exemplary method 500 for speech detection, according to embodiments of the disclosure. Method 500 may be implemented by system 101, specifically speech detector 105 (e.g., a set of voice activity detectors 206 and decision module 207 of speech detector 105 shown in FIG. 2B), and may include steps 502-508 as described below. In some embodiments, steps 504-506 may be performed to implement step 304 in FIG. 3. Some of the steps may be optional to perform the disclosure provided herein. Further, some of the steps may be performed simultaneously, or in a different order than shown in FIG. 5.

In step 502, speech detector 105 receives a multichannel audio input that includes a set of audio signals from a set of audio channels in audio detection array 106. For example, each voice activity detector 206 in speech detector 105 may receive a corresponding audio signal from audio detection array 106.

In step 504, speech detector 105 processes each audio signal using a neural network classifier to make a speech estimation from the corresponding audio signal, so that a set of speech estimations is generated for the set of audio signals. The set of speech estimations may include, for each time window, a corresponding set of estimation results for the set of audio signals. For example, each voice activity detector 206 may process the corresponding audio signal using a neural network classifier to make a speech estimation from the corresponding audio signal. As a result, by performing similar operations, the set of voice activity detectors 206 may generate a set of speech estimations for the set of audio signals, respectively.

In step 506, speech detector 105 fuses the set of speech estimations for the set of audio signals to generate a series of classification results in the series of time windows for the multichannel audio input. For example, for each time window, decision module 207 in speech detector 105 may fuse the corresponding set of estimation results included in the set of speech estimations to generate a classification result for the corresponding time window. As a result, decision module 207 may generate a series of classification results for the series of time windows, with each time window having a classification result.

In step 508, speech detector 105 determines, for each time window, whether a speech segment exists in the multichannel audio input during the corresponding time window based on a classification result for the corresponding time window. For example, for each time window, decision module 207 determines whether the multichannel audio input includes speech data in the corresponding time window based on the classification result of the corresponding time window.

Figure 6:
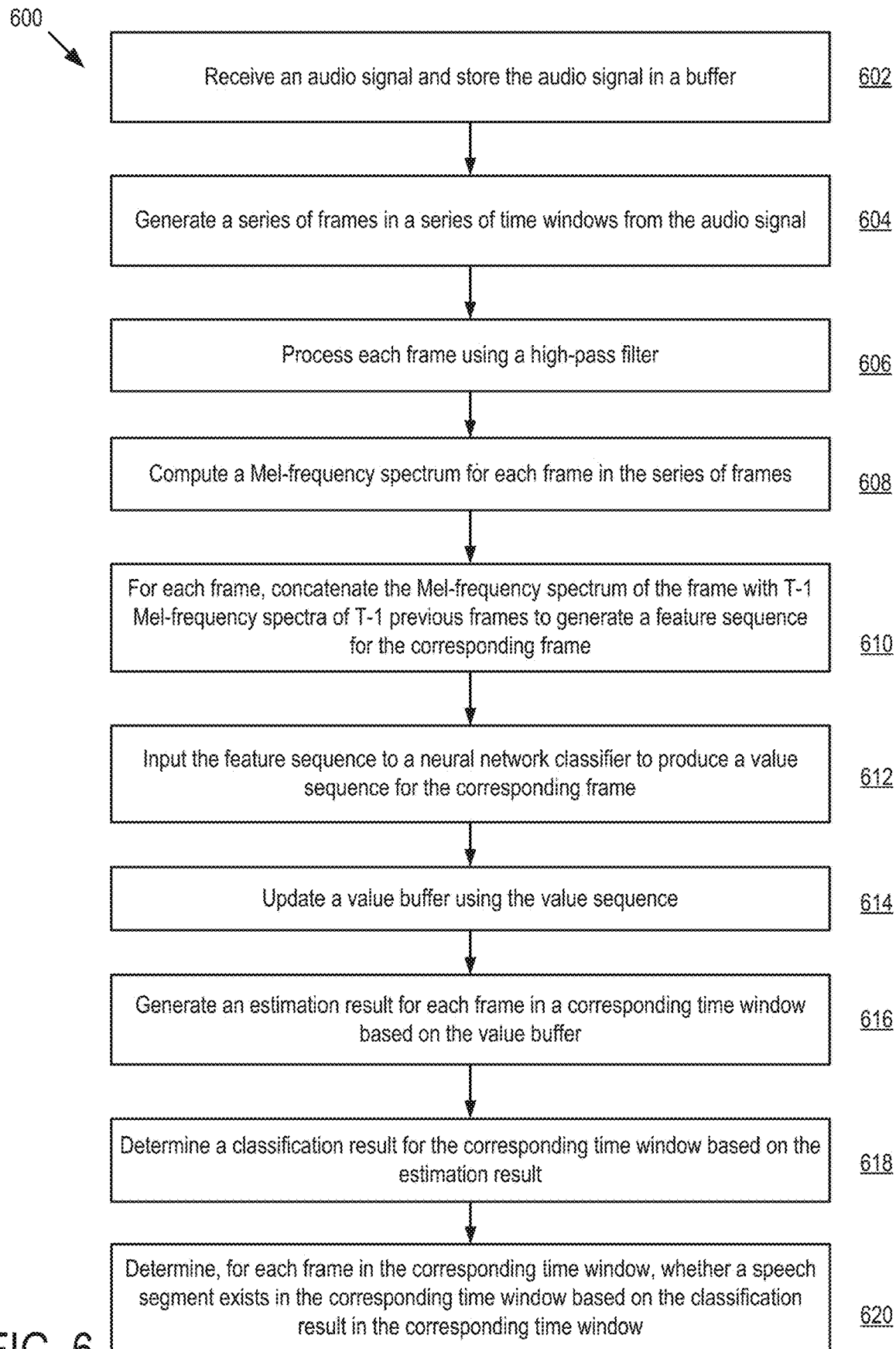
FIG. 6 is a flow chart of still yet another exemplary method for speech detection, according to embodiments of the disclosure.

FIG. 6 is a flow chart of still yet another exemplary method 600 for speech detection, according to embodiments of the disclosure. Method 600 may be implemented by system 101, specifically speech detector 105 (e.g., voice activity detector 206 and decision module 207 of speech detector 105 shown in FIGS. 2A-2B), and may include steps 602-620 as described below. In some embodiments, steps 604-618 may be performed to implement step 304 in FIG. 3. Some of the steps may be optional to perform the disclosure provided herein. Further, some of the steps may be performed simultaneously, or in a different order than shown in FIG. 6.

In step 602, voice activity detector 206 receives an audio signal and stores the audio signal in a buffer. For example, the audio signal can be a combined audio signal outputted by preprocessing unit 204 of FIG. 2A. Or, the audio signal can be any audio signal from the set of audio signals outputted by audio detection array 106.

In step 604, voice activity detector 206 generates a series of frames in a series of time windows from the audio signal.

In step 606, voice activity detector 206 processes each frame using a high-pass filter. For example, voice activity detector 206 may use a high-pass filter to remove a DC offset and low frequency noise from the corresponding frame.

In step 608, voice activity detector 206 computes a Mel-frequency spectrum for each frame in the series of frames. Voice activity detector 206 may store the Mel-frequency spectrum of each frame in feature buffer 208.

In step 610, for each frame, voice activity detector 206 concatenates the Mel-frequency spectrum of the corresponding frame with T−1 Mel-frequency spectra of T−1 previous frames to generate a feature sequence for the frame. For example, voice activity detector 206 may retrieve the T−1 Mel-frequency spectra of the T−1 previous frames from feature buffer 208, and may form the feature sequence using the T−1 Mel-frequency spectra of the T−1 previous frames and the Mel-frequency spectrum of the corresponding frame.

In step 612, voice activity detector 206 inputs the feature sequence to a neural network classifier to produce a value sequence for the corresponding frame. The value sequence may include a value estimation for the corresponding frame and T−1 value estimations for the T−1 previous frames. The value sequence may have a same length as the feature sequence.

In step 614, voice activity detector 206 updates value buffer 209 using the value sequence. For example, voice activity detector 206 stores the value sequence in value buffer 209.

In step 616, voice activity detector 206 generates an estimation result for each frame in a corresponding time window based on value buffer 209. For example, value buffer 209 may include one or more value estimations for each frame. Voice activity detector 206 may generate an estimation result for each frame as an average, a maximum or a minimum of one or more values included in the one or more value estimations for the corresponding frame.

In step 618, decision module 207 determines a classification result for the corresponding time window based on the estimation result. For example, decision module 207 may compare the estimation result with a predetermined threshold and determine a speech classification result (e.g., "1") for the corresponding time window if the estimation result is not less than the predetermined threshold. If the estimation result is less than the predetermined threshold, decision module 207 determines a non-speech classification result (e.g., "0") for the corresponding time window.

In step 620, decision module 207 determines, for each frame in the corresponding time window, whether a speech segment exists in the corresponding time window based on the classification result in the corresponding time window. For example, if the classification result is a speech classification result (e.g., "1"), decision module 207 determines that the multichannel audio input includes speech data in the corresponding time window. If the classification result is a non-speech classification result (e.g., "0"), decision module 207 determines that the multichannel audio input does not include speech data in the corresponding time window.

Figure 7A:
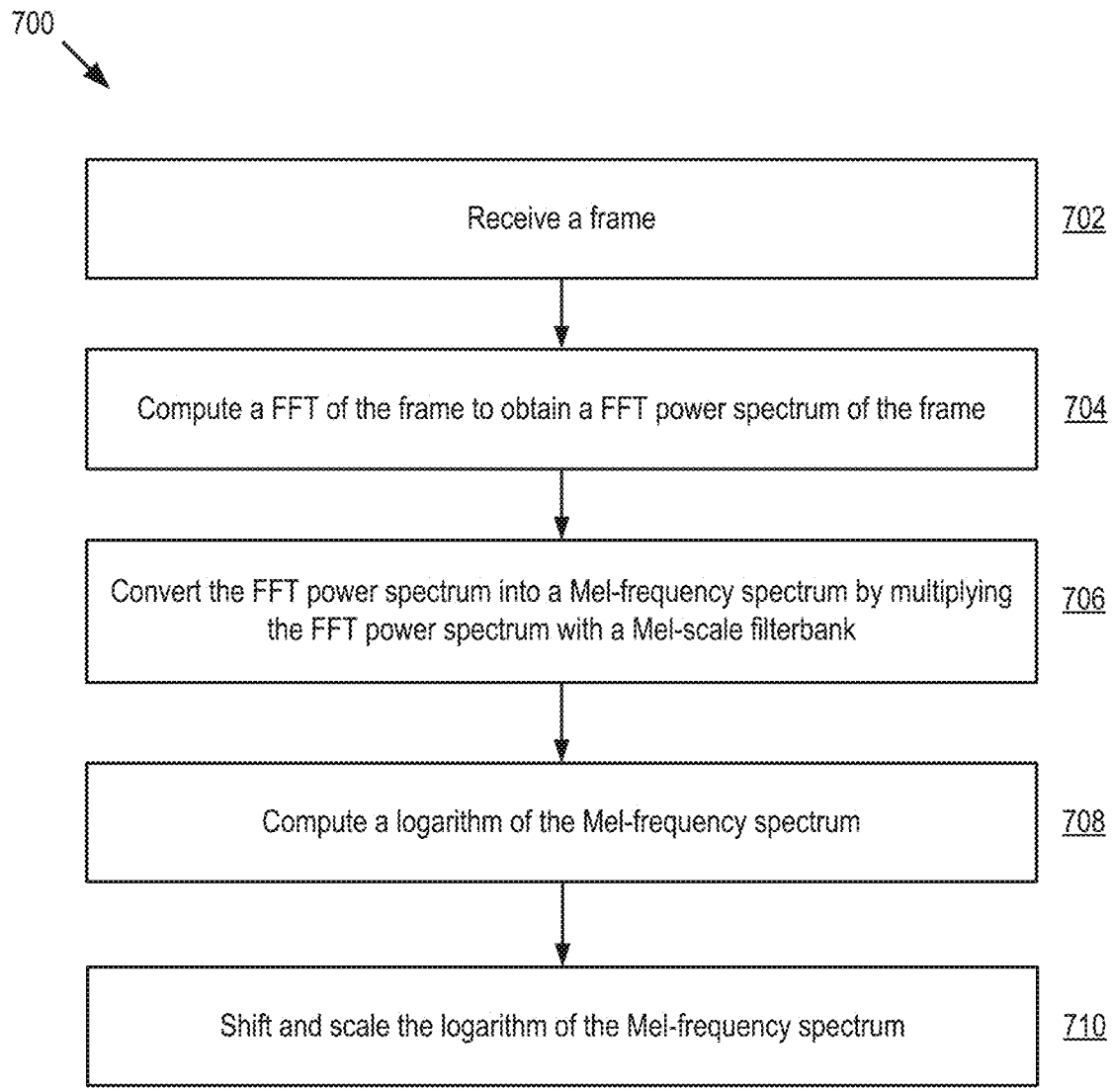
FIG. 7A is a flow chart of an exemplary method for computing a Mel-frequency spectrum, according to embodiments of the disclosure.

FIG. 7A is a flow chart of an exemplary method 700 for computing a Mel-frequency spectrum for a frame, according to embodiments of the disclosure. Method 700 may be implemented by system 101, specifically speech detector 105 (e.g., voice activity detector 206 shown in FIGS. 2A-2B), and may include steps 702-710 as described below. In some embodiments, steps 704-710 may be performed to implement step 608 in FIG. 6. Some of the steps may be optional to perform the disclosure provided herein. Further, some of the steps may be performed simultaneously, or in a different order than shown in FIG. 7A.

In step 702, voice activity detector 206 receives a frame among a series of frames. For example, the series of frames can be obtained from an audio signal (or a combined audio signal). Each frame may include one or more samples of the audio signal (or the combined audio signal) in a corresponding time window.

In step 704, voice activity detector 206 computes a fast fourier transform (FFT) of the frame to obtain a FFT power spectrum of the frame. For example, the FFT of the frame is computed with a FFT size equal to a total number of samples included in the frame.

Figure 7B:
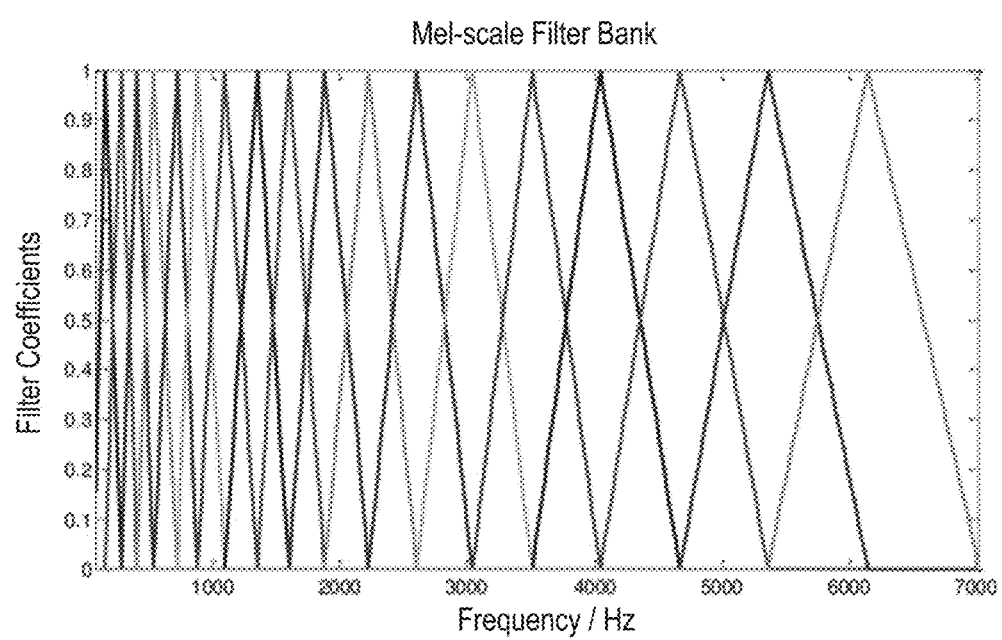
FIG. 7B is a graphical representation of an exemplary Mel-scale filter bank for computing a Mel-frequency spectrum, according to embodiments of the disclosure.

In step 706, voice activity detector 206 converts the FFT power spectrum into a Mel-frequency spectrum by multiplying the FFT power spectrum with a Mel-scale filter bank. For example, human ears are more discriminative at lower frequencies and less discriminative at higher frequencies. The Mel scale is intended to mimic non-linear human ear perception of sounds. The Mel-scale filter bank can produce a higher resolution at low frequencies and a lower resolution at high frequencies. In some embodiments, the Mel-scale filter bank may include multiple filters (e.g., 24 triangular filters). An exemplary Mel-scale filter bank is shown in FIG. 7B with triangular filters.

In step 708, voice activity detector 206 computes a logarithm of the Mel-frequency spectrum. For example, voice activity detector 206 can compute a logarithm of the Mel-frequency spectrum with a base of 10.

In step 710, voice activity detector 206 shifts and scales the logarithm of the Mel-frequency spectrum. For example, the logarithm of the Mel-frequency spectrum can be shifted and scaled to keep within a same range with logarithms of Mel-frequency spectra of other frames.

FIG. 8A is a schematic diagram 800 illustrating an exemplary structure of a causal TCN, according to embodiments of the disclosure. In a "causal" TCN, there is no information leakage from future to past. For example, an output of the causal TCN at a timestep t is determined based on an input of the TCN at the timestep t and one or more previous inputs of the TCN at one or more previous timesteps before the timestep t. In some embodiments, the causal TCN uses one or more dilated convolutions to add memory capabilities into the network. An application of the dilated convolutions enables an exponentially large receptive field of the causal TCN.

In some embodiments, the causal TCN may include one or more serially connected residual blocks 802. For example, the causal TCN may include N residual blocks that are connected in series, with a total depth of the causal TCN to be N, where N is a positive integer. Each residual block 802 may include a dilated one-dimensional (1D) convolution as shown in FIG. 8B. In some embodiments, dilation factor d for a dilated 1D convolution in each residual block 802 can be increased exponentially with a depth of residual block 802. For example, for an $n^{th}$ residual block ($1 \leq n \leq N$), a dilation factor d for the corresponding dilated 1D convolution is $d=2^{n-1}$.

In some embodiments, the causal TCN may also include one or more of a time distributed fully connected layer 804 with a hyperbolic tangent (tanh) activation function, a dropout layer 806, and a dense layer 808 with a tanh activation function. Time distributed fully connected layer 804, dropout layer 806 and dense layer 808 can be applied in series with residual blocks 802. Time distributed fully connected layer 804 can be a time distributed dense layer with D units and configured to expand an output of the residual blocks 802, where D is a positive integer. Dropout layer 856 can be configured for regularization. Dense layer 808 can be a time distributed dense layer with D units (e.g., D=1 or any other suitable value), and configured to adjust a dimension of an output of the causal TCN. D may be the number of neurons in dense layer 808. For example, dense layer 808 can be configured to adjust an output of the causal TCN to have a size of T×1.

In some embodiments, a feature sequence may include a feature of a current frame concatenated with T−1 features of T−1 previous frames, with each feature being a B-length vector, where T and B are positive integers. Thus, the feature sequence may have a size of T×B (e.g., a length of T and a width of B). Here, T represents a number of frames processed by the causal TCN, which is also equal to a number of time windows (or timesteps) processed by the causal TCN. B represents a number of samples in each feature such as a number of feature samples in each Mel-frequency spectrum (e.g., a number of Mel-frequency bands). F represents a number of filters in the dilated 1D convolution as shown in FIG. 8B. If a feature for a frame is represented by a Mel-frequency spectrum of the frame, then B also represents a number of samples in the Mel-frequency spectrum of the frame.

An example working process of the causal TCN is described here. Initially, the feature sequence can be inputted to the causal TCN and processed by residual blocks 802, which generate an output with a size of T×F. Here, F denotes a number of filters in each 1D dilated convolution of residual blocks 802. For example, a first residual block in the N residual blocks may receive the feature sequence as an input and generate a first intermediate result with a size of T×F. The first intermediate result can be inputted to a second residual block, so that the second residual block can generate a second intermediate result with a size of T×F. Similarly, an $(n-1)^{th}$ intermediate result can be inputted to an $n^{th}$ residual block, so that the $n^{th}$ residual block can generate an $n^{th}$ intermediate result with a size of T×F. The output of residual blocks 802 can be an $N^{th}$ intermediate result generated by an $N^{th}$ residual block with a size of T×F.

Next, the output of residual blocks 802 can be inputted to time distributed fully connected layer 804 and dropout layer 806 to generate an output with a size of T×D. The output with the size of T×D can be processed by dense layer 808 to produce an output with a size of T×1, which is a value sequence. Dense layer 808 may convert the output of dropout layer 806 with the size of T×D to the output with a size of T×1. The value sequence may include a value estimation for the current frame concatenated with T−1 value estimations for the T−1 previous frames (equivalently, the value sequence may include a value estimation for the current time window concatenated with T−1 value estimations for the T−1 previous time windows). For example, each value estimation may include a value within a range of [0, 1].

FIG. 8B is a schematic diagram 850 illustrating an exemplary structure of a residual block (e.g., residual block 802) in a causal TCN, according to embodiments of the disclosure. In some embodiments, the causal TCN includes N serially connected residual blocks. The residual block in FIG. 8B may represent an $n^{th}$ residual block ($1 \le n \le N$) of the N serially connected residual blocks. The residual block may include a dilated 1D convolution 852 with F filters, a kernel size L and a dilation factor $d=2^{(n-1)}$ (e.g., [L]Conv1D(×F), with $d=2^{(n-1)}$). The residual block may further include a rectified linear unit (ReLU) activation function applied in series with dilated 1D convolution 852. Consistent with the disclosure, [L]Conv1D(×F) may represent a 1D convolution with F filters and a kernel size L, where F denotes a dimensionality of the output space (e.g., the number of output filters in the convolution), and the kernel size L specifies a length of the 1D convolution window.

In some embodiments, the residual block may also include a dropout layer 856 applied in series with dilated 1D convolution 852. Dropout layer 856 can be configured for regularization and applied after the ReLU activation function. For example, dropout layer 856 can be a spatial dropout added after dilated 1D convolution 852 for regularization in order to avoid overfitting problems.

In some embodiments, the residual block may also include an adder 860 configured to add an output of dropout layer 856 with an input 851 of the residual block. For example, adder 860 can be configured to perform an element-wise addition for the output of dropout layer 856 and input 851.

In some embodiments, input 851 to the residual block (e.g., an $n^{th}$ residual block with $1 \le n \le N$) has a size of T×Z, where Z is a positive integer. For example, if the residual block is the $1^{st}$ residual block in the series of N residual blocks, input 851 will be the feature sequence with a size of T×B (in other words, Z=B in this case). Otherwise, the residual block (e.g., an $n^{th}$ residual block with n>1) receives an $(n-1)^{th}$ intermediate result from an $(n-1)^{th}$ residual block as input 851. In this case, input 851 has a size of T×F (in other words, Z=F in this case).

An example working process of the residual block is described here. Initially, input 851 can be processed by dilated 1D convolution 852 and the ReLU activation function to generate a first output. The first output is then processed by dropout layer 856 to generate a second output with a size of T×F. Next, adder 860 can be applied to the second output from dropout layer 856 and input 851 (or a variant of input 851) to generate an output 861, which is the $n^{th}$ intermediate result ($1 \le n \le N$) described above with reference to FIG. 8A.

For example, if the residual block is the $1^{st}$ residual block with Z=B and F≠B, the residual block may also include a residual connection (e.g., a residual 1D convolution 858) applied in parallel with dilated 1D convolution 852. Residual 1D convolution 858 can be configured to account for the discrepancy between an input width (e.g., B) and an output width (e.g., F), to ensure that adder 860 (e.g., an adder for performing an element-wise addition) receives tensors of the same shape. Residual 1D convolution 858 may have F filters and a kernel size of 1 (e.g., [1]Conv1D(×F)). A linear activation function may be applied in series with residual 1D convolution 858. Residual 1D convolution 858 may process input 851 having the size of T×B to generate a third output having the size of T×F. The third output can be considered as a variant of input 851. Adder 860 can be applied to the second output from dropout layer 856 and the third output from residual 1D convolution 858 to generate output 861, which is the $1^{st}$ intermediate result.

In another example, if the residual block is the $1^{st}$ residual block and Z=F=B, no residual connection is needed in the residual block. For example, because input 851 and the second output from dropout layer 856 have a same size, no residual 1D convolution 858 is included in the residual block. Adder 860 can be applied to the second output from dropout layer 856 and input 851 to generate output 861, which is the $1^{st}$ intermediate result.

In yet another example, if the residual block is an $n^{th}$ residual block with n>1 (in this case Z=F), no residual connection is needed in the residual block. Adder 860 can be applied to the second output from dropout layer 856 and input 851 to generate output 861, which is an $n^{th}$ intermediate result (n>1).

Consistent with FIGS. 8A-8B, the causal TCN described herein can be a simplified version of a typical TCN. For example, the typical TCNs for speech detection and classification usually use an encoder-TCN-decoder architecture, with each residual block of the standard TCN including at least 2 dilated convolutions. However, the causal TCN described herein can eliminate the encoder and decoder, and may instead just include a dilated causal convolution in each residual block (thus "simplified"). As a result, the number of hyper-parameters of the causal TCN described herein is reduced by at least a magnitude of 10 in comparison with the standard TCN, which greatly reduces a computational cost for speech detection and classification. As a result, the speech detection techniques with the causal TCN described herein can be implemented in real time or near real time.

FIG. 9 is a schematic diagram 900 illustrating an exemplary value buffer (e.g., value buffer 209), according to embodiments of the disclosure. A plurality of time windows M−2, M−1, M, M+1 and M+2 that correspond to frames M−2, M−1, M, M+1 and M+2 are illustrated in FIG. 9 by way of examples, where M is a positive integer and greater than 2. The value buffer stores value estimations for each frame.

Assume that T=3 (e.g., a feature sequence includes 3 features for 3 frames) and B=2 (e.g., 2 samples in each frame). For a time window M that corresponds to a frame M, a feature sequence for the frame M can be generated by concatenating a feature of the frame M with a feature of a frame M−1 and a feature of a frame M−2. The feature sequence of the frame M can be processed by a neural network classifier to generate a value sequence 902 for the frame M. The value sequence 902 includes a value estimation (including a value $V_{M,1}$) for the frame M, a value estimation (including a value $V_{M-1,2}$) for the frame M−1, and a value estimation (including a value $V_{M-2,3}$) for the frame M−2. Next, for a time window M+1 that corresponds to a frame M+1, a value sequence for the frame M+1 can be generated to include a value estimation (including a value $V_{M+1,1}$) for the frame M+1, a value estimation (including a value $V_{M,2}$) for the frame M, and a value estimation (including a value $V_{M-1,3}$) for the frame M−1. Similarly, for a time window M+2 that corresponds to a frame M+2, a value sequence for the frame M+2 can be generated to include a value estimation (including a value $V_{M+2,1}$) for the frame M+2, a value estimation (including a value $V_{M+1,2}$) for the frame M+1, and a value estimation (including a value $V_{M,3}$) for the frame M. As a result, with respect to the time window M, T value estimations 904 (with T=3) are generated for the frame M corresponding to the time window M, including $V_{M,t}$ with $1 \le t \le T$ (e.g., $V_{M,1}$, $V_{M,2}$, and $V_{M,3}$).

An estimation result for the time window M can be generated based on value estimations 904 of the frame M. For example, the estimation result can be an average, a maximum, a minimum, or a median, etc., of values in value estimations 904. In another example, the estimation result can be any value in value estimations 904.

In some embodiments, the estimation result for the time window M may be outputted to decision module 207 with a delay of T frames (or equivalently, T time windows). Thus, a classification result for the time window M generated by decision module 207 may have a delay of T frames. As a result, the speech detection techniques described herein may have a delay of T frames.

Figure 10:
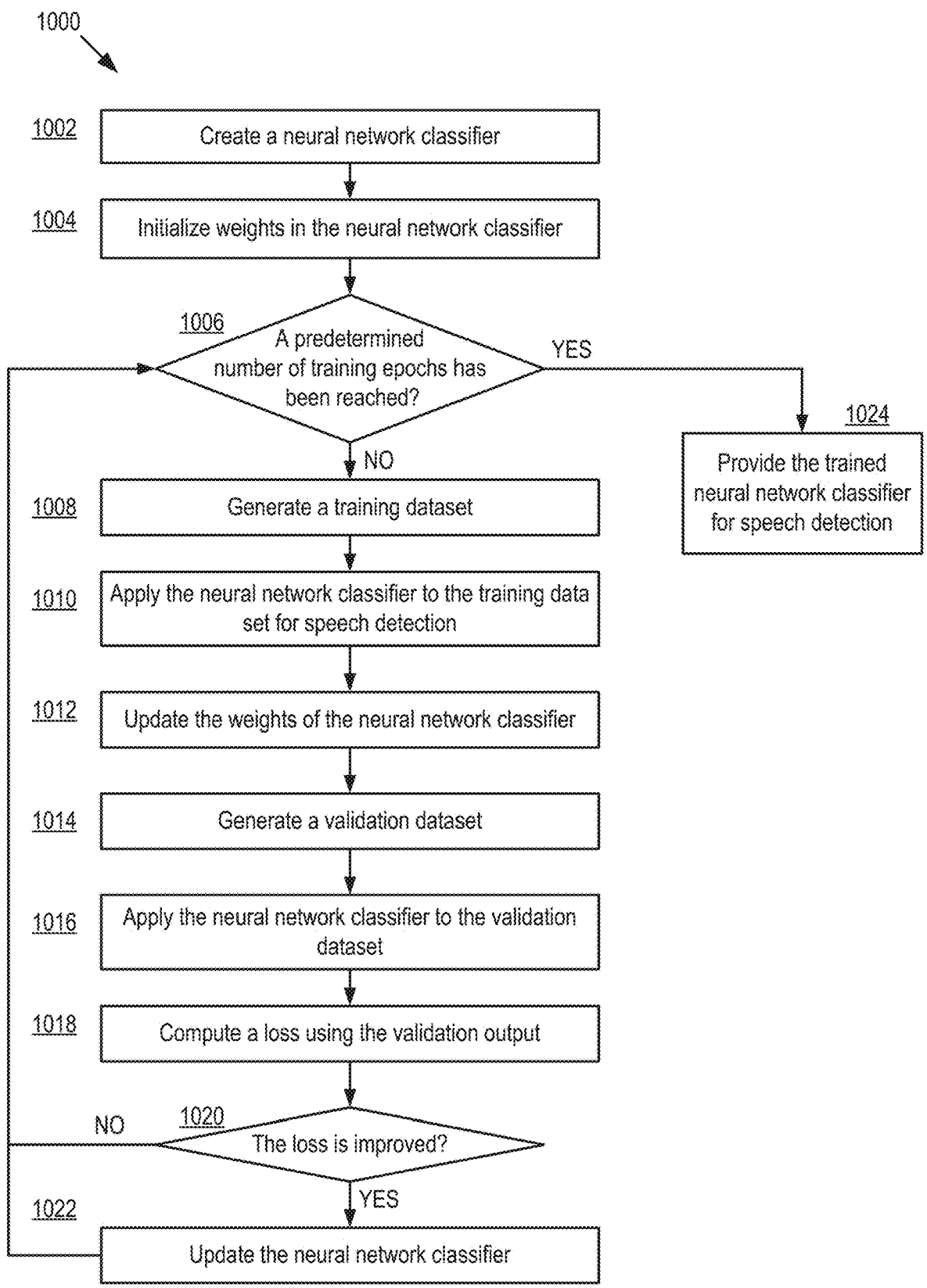
FIG. 10 is a flow chart of an exemplary method for training a neural network classifier for speech detection, according to embodiments of the disclosure.

FIG. 10 is a flow chart of an exemplary method 1000 for training a neural network classifier, according to embodiments of the disclosure. Method 1000 may be implemented by system 101, specifically training module 110, and may include steps 1002-1024 as described below. Some of the steps may be optional to perform the disclosure provided herein. Further, some of the steps may be performed simultaneously, or in a different order than shown in FIG. 10.

For example, method 1000 can be applied to train the causal TCN shown in FIGS. 8A-8B. The causal TCN can be trained by a predetermined number of epochs. For each training iteration (each epoch), a portion of or all the samples in a training dataset or a validation dataset are evaluated in batches. For example, a stochastic gradient descent (SGD) approach can be used to evaluate the samples in batches.

In step 1002, voice activity detector 206 creates a neural network classifier. For example, the neural network classifier is created to include the causal TCN shown in FIGS. 8A-8B.

In step 1004, training module 110 initializes weights in the neural network classifier. For example, all the weights may be set equal to begin with. As another example, the weights may be set using the weights of a previously trained neural network classifier.

In step 1006, training module 110 determines whether a predetermined number of training epochs has been reached. If the predetermined number of training epochs has been reached, method 1000 proceeds to step 1024. Otherwise, method 1000 proceeds to step 1008.

In step 1008, training data generator 109 generates a training dataset. The training dataset may include one or more batches of feature data and one or more batches of target value data. In some embodiments, step 1008 is performed to provide the training dataset in real time or near real time, to avoid loading all the datasets in the memory before a training process. However, it is contemplated that step 1008 can alternatively be performed before the training process starts.

In some embodiments, each batch of feature data may have a size of Q×T×B, where Q is a positive integer. For example, each batch of feature data includes Q feature sequences, with each feature sequence having a size of T×B. Each batch of target value data may have a size of Q×T×1. For example, each batch of target value data may include Q target value sequences, with each target value sequence having a size of T×1 and corresponding to a feature sequence in the batch of feature data. In some embodiments, each target value sequence includes a list of target value estimations for a list of features included in the corresponding feature sequence. For example, each target value sequence may include T target value estimations corresponding to T features included in the feature sequence. The generation of the training dataset and the target value estimations is described below in more details with reference to FIGS. 11-12.

In step 1010, training module 110 applies the neural network classifier to the training dataset to detect speech data therein. For example, training module 110 inputs each batch of feature data to the neural network classifier to generate a batch of value data correspondingly. The batch of value data may have a size of Q×T×1, and may include Q value sequences, with each value sequence having a size of T×1 and corresponding to a respective feature sequence in the batch of feature data. Training module 110 may compare the Q value sequences outputted by the neural network classifier with the Q target value sequences included in the training dataset to generate a training result. For example, the training result may be a value indicating a difference between the Q value sequences outputted by the neural network classifier and the Q target value sequences included in the training dataset. The smaller the difference is, the closer the weights are to their optimal values.

In step 1012, training module 110 updates the weights of the neural network classifier. For example, training module 110 may update the weights based on the training result. The weights may be changed significantly when the training result indicates a larger difference, and may be tweaked slightly when the training result indicates a smaller difference.

In step 1014, training data generator 109 generates a validation dataset. The validation dataset may include one or more batches of feature data and one or more batches of target value data. The validation dataset may include data similar to that of the training dataset. Similar description will not be repeated here. The validation dataset can be used to validate a performance of the neural network classifier. To achieve that purpose, the validation dataset should be independent and distinct from the training dataset used to train the neural network classifier. In some embodiments, step 1014 is performed to provide the validation dataset in real time or near real time, to avoid loading all the datasets in the memory before a training process. However, it is contemplated that step 1014 can alternatively be performed before the training process starts.

In step 1016, training module 110 applies the neural network classifier to the validation dataset. In step 1018, training module 110 computes a loss based on the output of the neural network classifier when applied to the validation dataset ("the validation output").

For example, with combined reference to steps 1016 and 1018, training module 110 inputs each batch of feature data from the validation dataset to the neural network classifier to generate a batch of value data correspondingly. The batch of value data may include one or more value sequences, with each value sequence corresponding to a respective feature sequence in the batch of feature data. Training module 110 may compare the one or more value sequences outputted by the neural network classifier with one or more corresponding target value sequences included in the validation dataset to evaluate a loss function, and may generate a loss of the neural network classifier using the loss function. The loss measures the difference between the value sequences outputted by the neural network classifier and the corresponding target value sequences included in the validation dataset, thus indicating the performance of the neural network classifier with the weights in the current iteration.

In step 1020, training module 110 determines whether the loss of the current iteration is improved over the last iteration. For example, training module 110 determines whether the loss decreases with respect to a previous loss calculated in a previous iteration. If the loss is improved (e.g., the loss decreases with respect to the previous loss), method 1000 proceeds to step 1022. Otherwise, method 1000 returns to step 1006.

In step 1022, training module 110 updates the neural network classifier. For example, training module 110 may adjust an architecture of the neural network classifier (e.g., the number of hidden units in the neural network) based on a performance of the neural network classifier on the validation dataset. A structure, weights and other parameters of the neural network classifier may be stored in storage 104 or training database 107. Method 1000 may return to step 1006 to determine whether the predetermined number of training epochs has been reached.

In step 1024, training module 110 provides the trained neural network classifier for speech detection. For example, if the predetermined number of training epochs has been reached, training module 110 can stop training the neural network classifier, and the trained neural network classifier can be provided for applications of speech detection.

Figure 11:
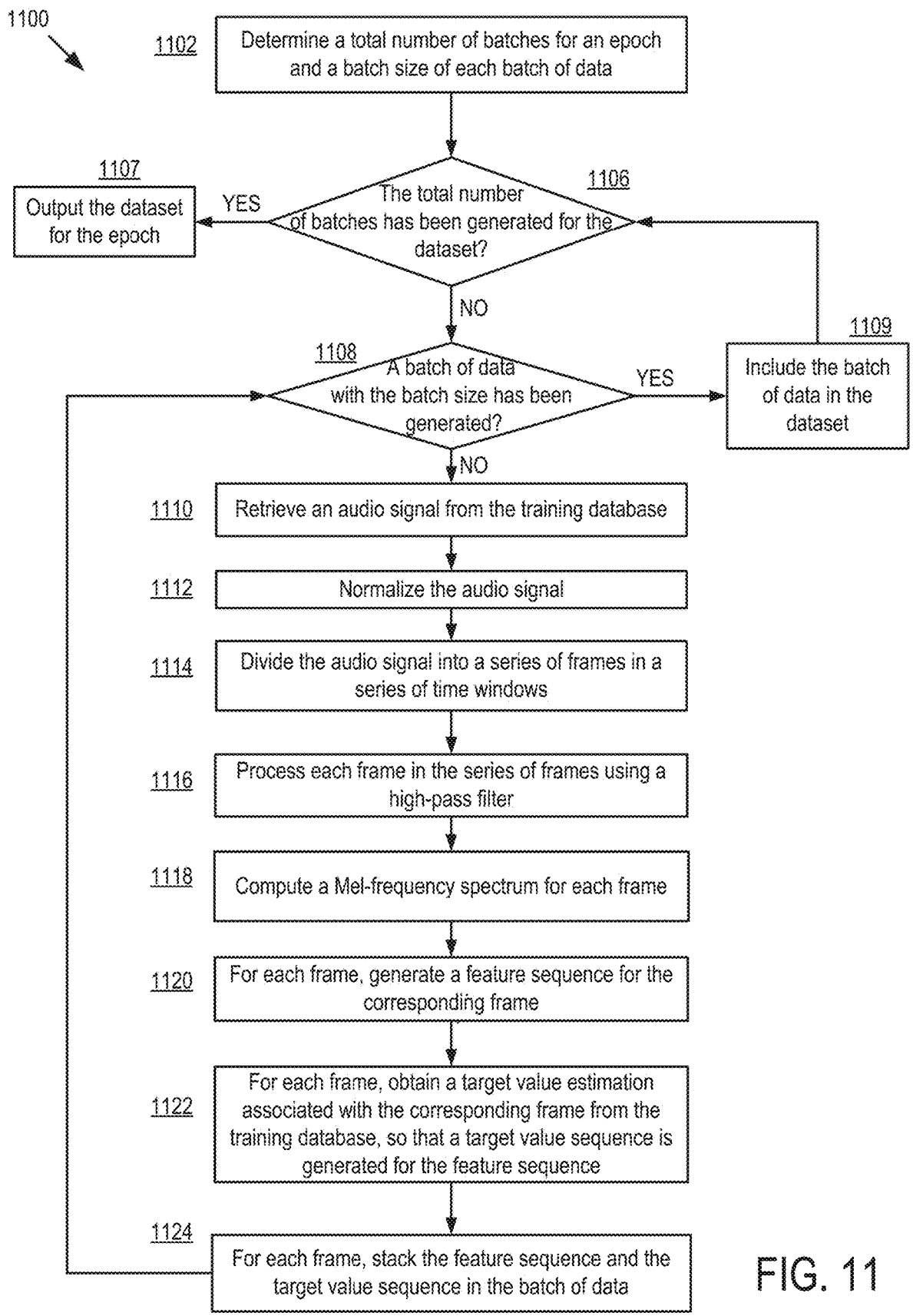
FIG. 11 is a flow chart of an exemplary method for generating a dataset used for training a neural network classifier for speech detection, according to embodiments of the disclosure.

FIG. 11 is a flow chart of an exemplary method 1100 for generating a dataset, according to embodiments of the disclosure. In some embodiments, the dataset can be a training dataset or a validation dataset. Method 1100 may be implemented by system 101, specifically training data generator 109, and may include steps 1102-1124 as described below. In some embodiments, method 1100 may be performed to implement each of steps 1008 and 1014 in FIG. 10. Some of the steps may be optional to perform the disclosure provided herein. Further, some of the steps may be performed simultaneously, or in a different order than shown in FIG. 11.

In step 1102, training data generator 109 determines a total number of batches in the dataset for an epoch and a batch size for each batch of data in the dataset. For example, the dataset to be generated may include P batches of data (e.g., including P batches of feature data and P batches of target value data), where P is a positive integer.

In step 1106, training data generator 109 determines whether the total number of batches has been generated for the dataset. If the total number of batches has been generated for the dataset, method 1100 proceeds to step 1107. Otherwise, method 1100 proceeds to step 1108.

In step 1107, training data generator 109 outputs the dataset for the epoch.

In step 1108, training data generator 109 determines whether a batch of data with the batch size has been generated. If the batch of data is generated, method 1100 proceeds to step 1109. Otherwise, method 1100 proceeds to step 1110. For example, training data generator 109 determines whether a batch of feature data and a batch of target value data corresponding to the batch of feature data are generated. If the batch of feature data and the batch of target value data are generated, method 1100 proceeds to step 1109. Otherwise, method 1100 proceeds to step 1110.

In step 1109, training data generator 109 includes the batch of data in the dataset. For example, training data generator 109 includes the batch of feature data and the batch of target value data in the dataset.

In step 1110, in order to generate the batch of data, training data generator 109 retrieves an audio signal from training database 107. In some embodiments, training data generator 109 may retrieve the audio signal from an audio database that is configured to store various audio signals. In some embodiments, training data generator 109 may generate the audio signal in real time or near real time by performing operations described below with reference to FIG. 12.

In step 1112, training data generator 109 normalizes the amplitude of the audio signal.

In step 1114, training data generator 109 divides the audio signal into a series of frames in a series of time windows. For example, training data generator 109 performs operations similar to those described above with reference to voice activity detector 206 to divide the audio signal into a series of frames in a series of time windows. Similar description will not be repeated here.

In step 1116, training data generator 109 processes each frame in the series of frames using a high-pass filter. For example, training data generator 109 processes each frame using a high-pass filter to remove a DC offset and low-frequency noise.

In step 1118, training data generator 109 computes a Mel-frequency spectrum for each frame. For example, training data generator 109 performs operations similar to those described above with reference to voice activity detector 206 to compute the Mel-frequency spectrum for each frame. Similar description will not be repeated here.

In step 1120, for each frame, training data generator 109 generates a feature sequence for the corresponding frame. For example, the feature sequence for the corresponding frame may include a feature for the corresponding frame and T−1 features for T−1 previous frames. In some embodiments, training data generator 109 performs operations similar to those described above with reference to voice activity detector 206 to generate a feature sequence for each frame. Similar description will not be repeated here.

In step 1122, for each frame, training data generator 109 obtains a target value estimation associated with the corresponding frame from training database 107, so that a target value sequence is generated for the feature sequence. For example, training data generator 109 can retrieve the target value estimation for the corresponding frame and T−1 target value estimations for T−1 previous frames from training database 107, and can concatenate the target value estimation for the corresponding frame and the T−1 target value estimations for the T−1 previous frames to form the target value sequence.

In step 1124, for each frame, training data generator 109 stacks the feature sequence and the target value sequence in the batch of data. For example, training data generator 109 stacks the feature sequence in the batch of feature data and stacks the target value sequence in the batch of target value data. Method 1100 may return to step 1108 to determine whether all the data in the batch of data with the batch size is generated. If all the data in the batch of data is generated, method 1100 proceeds to step 1109. Otherwise, method 1100 may repeat steps 1110-1124 to continue generating feature sequences and target value sequences for the batch of data.

Figure 12:
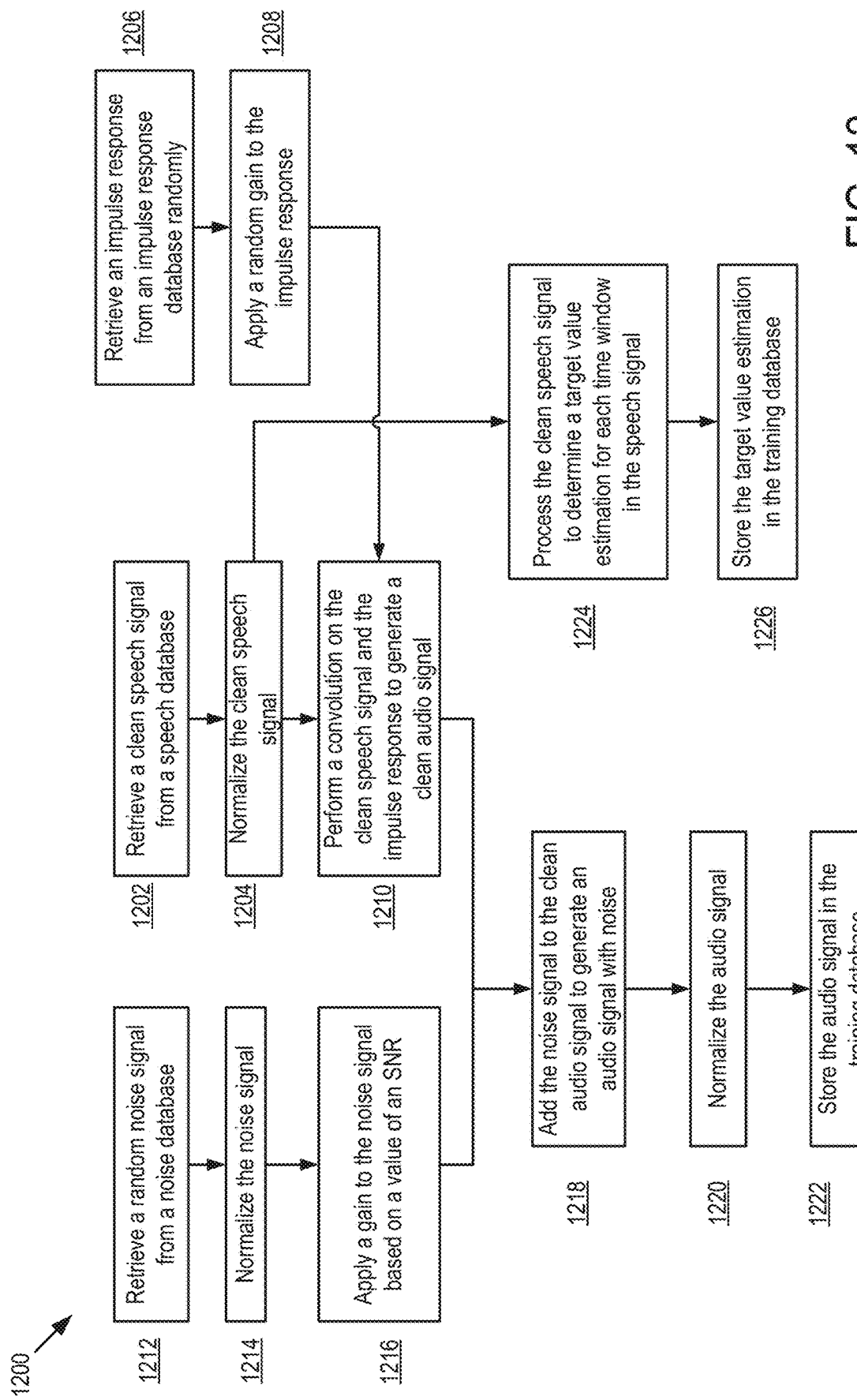
FIG. 12 is a flow chart of an exemplary method for generating an audio signal used for training a neural network classifier for speech detection, according to embodiments of the disclosure.

FIG. 12 is a flowchart of an exemplary method 1200 for generating an audio signal for a training process, according to embodiments of the disclosure. Method 1200 may be implemented by system 101, specifically training data generator 109, and may include steps 1202-1226 as described below. In some embodiments, method 1200 may be performed to provide the audio signal to step 1110 in FIG. 11. Some of the steps may be optional to perform the disclosure provided herein. Further, some of the steps may be performed simultaneously, or in a different order than shown in FIG. 12.

In step 1202, training data generator 109 retrieves a clean speech signal from a speech database. Consistent with the disclosure, a "clean" speech signal is an audio signal that contains predominantly speech data and is substantially free from noise. The speech database may be configured to store various clean speech signals recorded by different audio detection devices. The speech database may be included in system 101.

In step 1204, training data generator 109 normalizes the clean speech signal. For example, training data generator 109 normalizes the amplitude of the clean speech signal.

In step 1206, training data generator 109 retrieves an impulse response from an impulse response database randomly. In some embodiments, the impulse response database may be configured to store various impulse responses in different acoustic conditions. The impulse response can be selected from one of the various impulse responses randomly. The impulse response database may be included in system 101.

In step 1208, training data generator 109 applies a random gain to the impulse response. For example, the random gain can be a gain selected randomly to extend an acoustic condition of the impulse response.

In step 1210, training data generator 109 performs a convolution on the clean speech signal and the impulse response to generate a clean audio signal. For example, the clean speech signal is convolved with the impulse response to generate the clean audio signal.

In step 1212, training data generator 109 retrieves a noise signal from a noise database randomly. In some embodiments, the noise database may be configured to store various noise signals recorded in different noisy environments or simulated with computers. The noise signal can be selected as one of the various noise signals randomly. The noise database may be included in system 101.

In step 1214, training data generator 109 normalizes the noise signal. For example, the amplitude of the noise signal is normalized.

In step 1216, training data generator 109 applies a gain to the noise signal based on a value of a signal-to-noise ratio (SNR). For example, training data generator 109 selects a value for the SNR randomly. Training data generator 109 calculates a signal power level of the clean audio signal, and determines a noise power level for the noise signal as: (the noise power level)=(the signal power level)÷(the SNR). The gain applied to the noise signal can be calculated as: (the gain)=(the noise power level)÷(a power level of the normalized noise signal). As a result, after applying the gain, the power level of the noise signal reaches the target noise power level.

In step 1218, training data generator 109 adds the noise signal to the clean audio signal to generate an audio signal with noise. For example, the audio signal can be a mixture of the clean speech signal, the impulse response and the noise signal.

In step 1220, training data generator 109 normalizes the audio signal. For example, the amplitude of the audio signal is normalized.

In step 1222, training data generator 109 stores the audio signal in the training database. In some embodiments, training data generator 109 may store the audio signal in an audio database. The audio database may be included in system 101.

In step 1224, training data generator 109 processes the clean speech signal from step 1204 to determine a corresponding target value estimation for each time window in the clean speech signal. For example, since the clean speech signal is substantially free from noise, a simple energy detector can be applied to detect speech data in the speech signal. Specifically, for each time window, if a speech segment exists in the speech signal, a target value estimation with a value of "1" can be generated for the time window. Otherwise, a target value estimation with a value of "0" can be generated for the time window, indicating that no speech data exists in the time window. In some embodiments, training data generator 109 may process the clean speech signal using a neural network classifier or any other available classifier to determine a corresponding target value estimation for each time window in the clean speech signal.

In step 1226, training data generator 109 stores the corresponding target value estimation for each time window in training database 107. In some embodiments, training data generator 109 may pair the target value estimations with the corresponding audio signal and store them in the audio database.

FIGS. 13A-13E are graphical representations illustrating exemplary performances of the speech detection techniques with the causal TCN described herein, according to embodiments of the disclosure. Test datasets used to evaluate the performance of the speech detection techniques are generated from 4,041 audio signals, each having a duration of 6 seconds (a total of 6.7 hours). These audio signals are generated by mixing different types of speech signals from different speakers with different types of noise and reverberations. Speakers and noise conditions in the audio signals are different from those used for training the causal TCN. Target value estimations are labeled for the audio signals. The audio signals are processed frame by frame to simulate a real-time processing of speech detection.

An overall classification metrics (in a frame level) are shown in the following Table 2 for 4 different approaches. The 4 approaches include: (1) a voice detector developed for the WebRTC project ("WebRTC"); (2) a CNN-based method for real-time voice detection in smartphones ("RT-CNN"); (3) a voice detection method designed to be robust, including a DAE and CNN ("DAE-CNN"); and (4) the speech detection techniques with the causal TCN described in this disclosure ("TCN"). The first three approaches are implemented for comparison purpose only. Table 2 demonstrates that the causal TCN described herein has a better performance in detecting speech signals than the other 3 approaches.

TABLE 2

|  | Accuracy | Speech Hit Rate (SHR) | Non-speech Hit Rate (NHR) |
| --- | --- | --- | --- |
| WebRTC | 71.6% | 67.7% | 75.5% |
| RT-CNN | 82.6% | 87.9% | 79.7% |
| DAE-CNN | 88.6% | 86.7% | 91.3% |
| TCN | 95.7% | 95.7% | 97.9% |

Figure 13A:
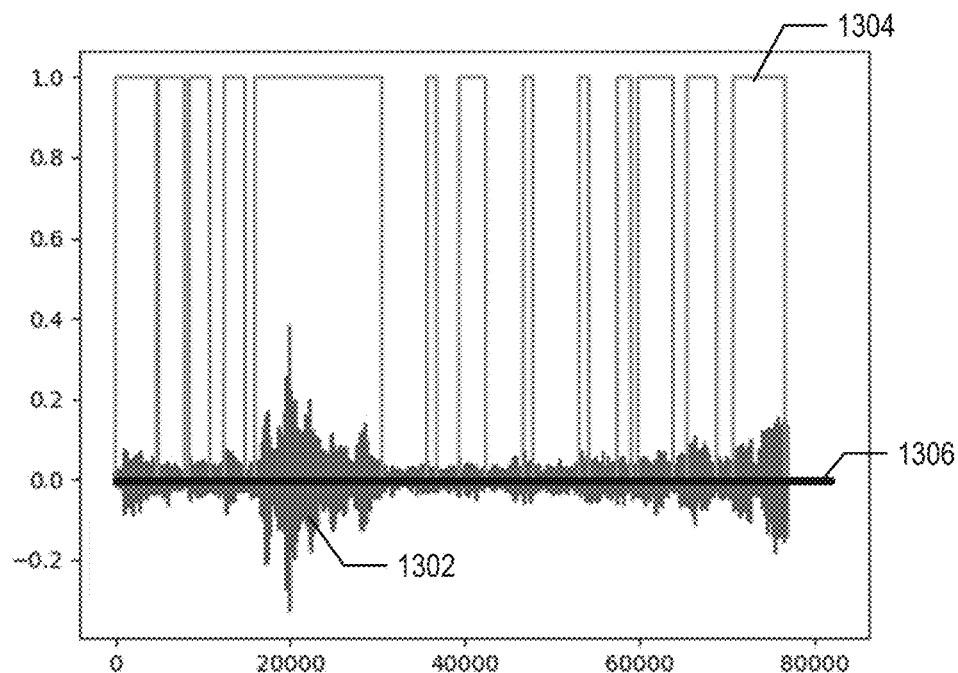
FIGS. 13A-13E are graphical representations illustrating exemplary speech detection performances of a causal TCN, according to embodiments of the disclosure.

In FIGS. 13A-13E, the performance of the causal TCN is also compared with the performance of WebRTC. With reference to FIG. 13A, an example of a normalized audio signal 1302 is shown in the figure. Classification results of WebRTC are shown using a curve 1304. In curve 1304, a time duration with a value of "1" indicates a speech segment (e.g., presence of speech data), while a time duration with a value of "0" indicates a non-speech segment (e.g., absence of speech data). The classification results of WebRTC indicate that there are multiple speech segments in the audio signal 1302. These classification results of WebRTC are not completely correct because WebRTC has misclassified some non-speech segments to be speech segments. On the other hand, classification results of TCN are shown using a curve 1306, which is a straight line with a value of "0" indicating that there is no speech data in the audio signal 1302. These classification results are correct because the audio signal 1302 is mainly formed by noise.

Figure 13B:
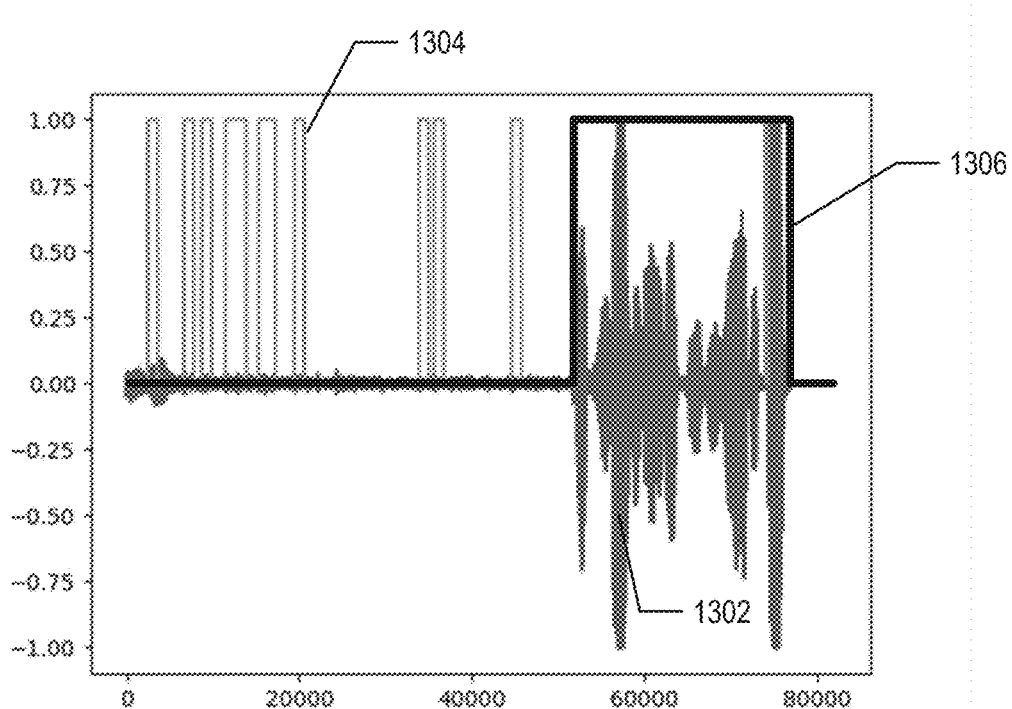
Figure 13C:
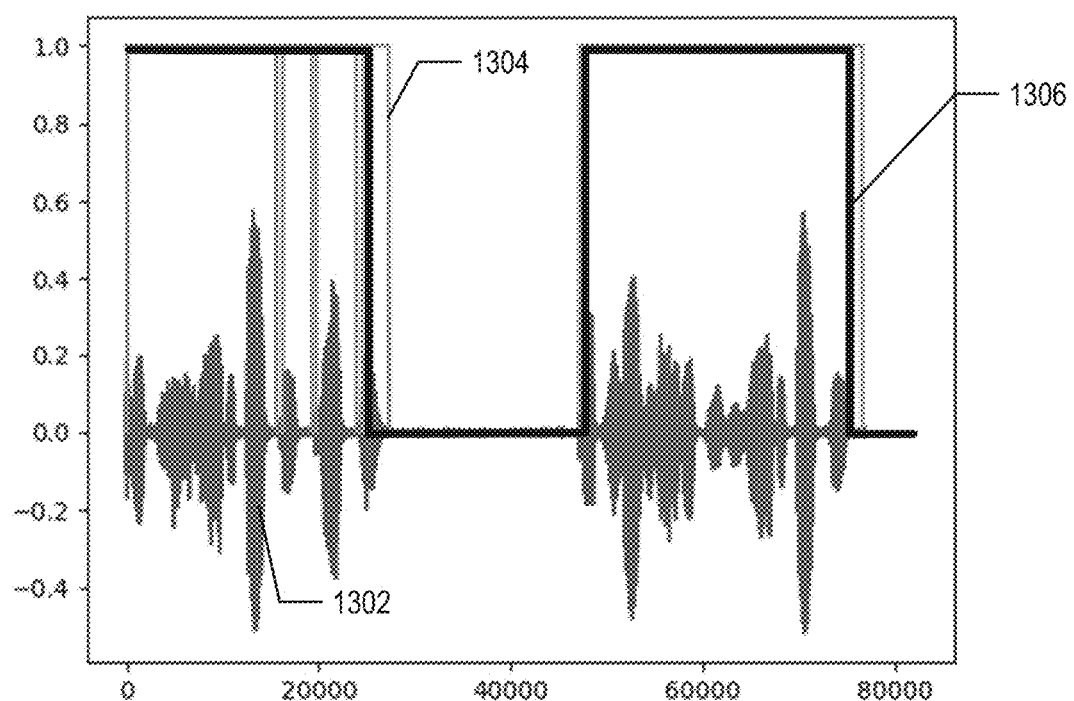
Figure 13D:
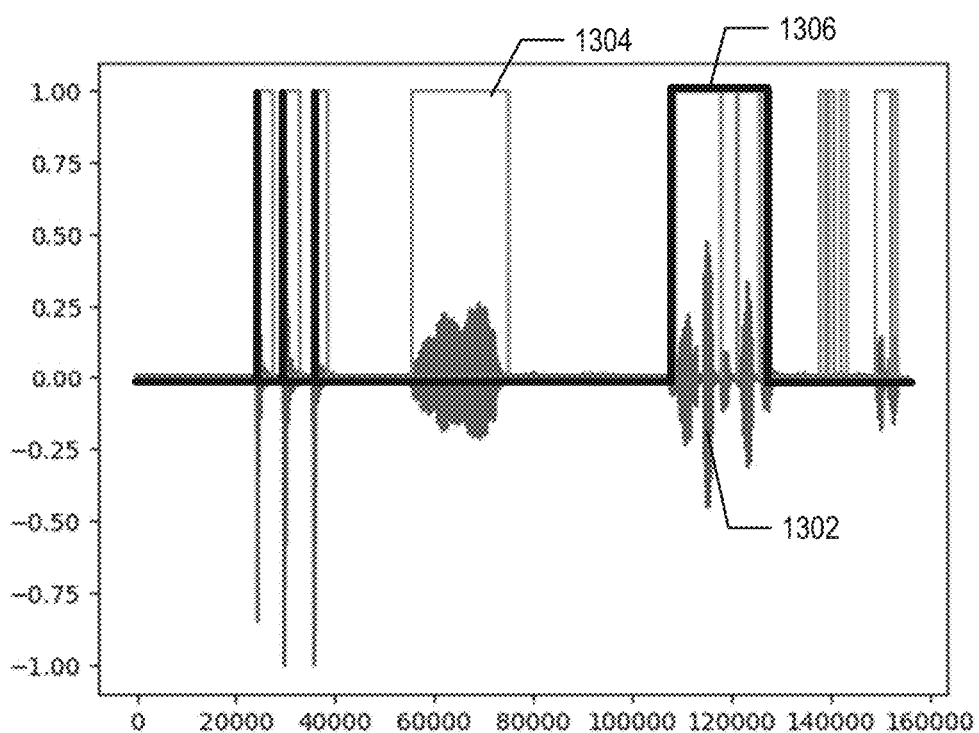
Figure 13E:
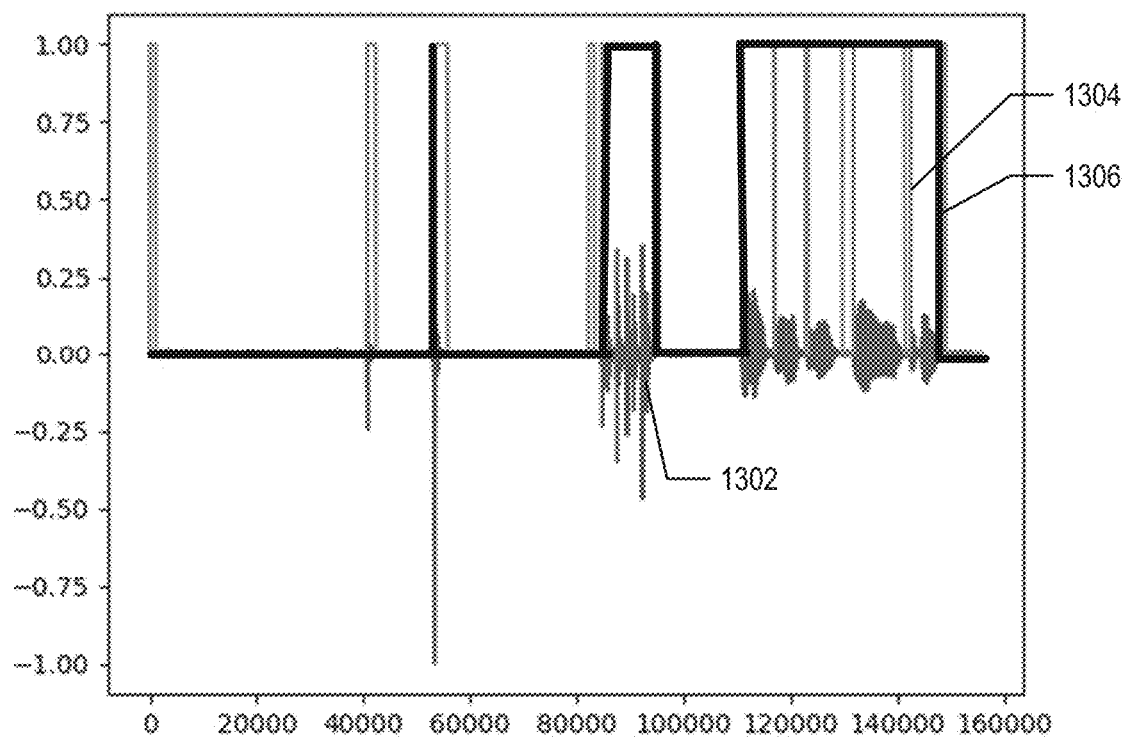

FIG. 13B shows another example of the normalized audio signal 1302, classification results of WebRTC (curve 1304) and classification results of TCN (curve 1306). It can be seen that curve 1306 correctly identifies a time duration with a value of "1" in which speech data exists. Curve 1304 indicates that WebRTC has misclassified some non-speech segments to be speech segments. Similar observations can be obtained from FIGS. 13C-13E, and the description will not be repeated here. FIGS. 13A-13E show that the causal TCN described herein outperforms the WebRTC approach.

The speech detection techniques described herein can apply a neural network classifier to determine whether a multichannel audio input includes speech data in one or more time windows in real time or near real time. The speech detection techniques can be helpful for various speech processing systems that are configured to detect human speech. The speech detection techniques can be applied in a human-machine interaction (HMI), such as a human-robot interaction (HRI), to detect a user's intention to communicate with a machine, such as a robot. For example, the speech detection techniques can be used for speaker detection and localization (e.g., detecting a presence or an absence of a speaker and locating a position of the speaker if the speaker is present).

In the case of HRI, the speech detection techniques can be used to detect a beginning of a voice interaction using natural language, so that a location of a speaker can be determined and a robot can be turned to face the speaker. Then, an automatic speech recognition engine can be activated to listen to the speaker. This is helpful for improving an efficiency of the automatic speech recognition engine. For example, the automatic speech recognition engine can be turned on and start to transcribe audio signals if speech data is detected in an audio signal, and can be turned off if no speech data is detected in the audio signal.

It is appreciated that speaker localization in HRI can make voice interactions between the speaker and the robot more natural and similar to voice interactions between humans. Specifically, when people communicate by speech, they usually face each other to obtain visual information for a better understanding of the communicated messages. The visual information (e.g., a movement of lips, emotions on face, etc.) can be helpful for understanding the messages. This human communication mechanism can be simulated in robots using cameras, microphones and artificial intelligence algorithms. For example, one or more cameras can be positioned on a face of a robot and a microphone array can be placed on the head of the robot. By applying the speech detection techniques described herein, a presence of speech data can be detected using a multichannel audio input from the microphone array if a speaker starts to speak. The speaker can be localized and then the robot can be turned towards that location so that the one or more cameras aim at the speaker. For example, speech-source localization techniques can be used to localize the speaker from the multichannel audio input acquired by the microphone array. Through the speech detection and the speaker localization, the robot can be triggered to turn to face the speaker only if an actual speech is detected, rather than in response to any received sound event if it does not contain any speech.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A method for speech detection, comprising:
 receiving a multichannel audio input that includes a set of audio signals from a set of audio channels in an audio detection array;
 processing the multichannel audio input using a neural network classifier to generate a series of classification results in a series of time windows for the multichannel audio input, wherein the neural network classifier comprises a causal temporal convolutional network (TCN) configured to determine a classification result for each time window based on portions of the multichannel audio input in the corresponding time window and one or more time windows before the corresponding time window; and
 determining whether the multichannel audio input includes one or more speech segments in the series of time windows based on the series of classification results.

2. The method of claim 1, wherein the causal TCN comprises one or more serially connected residual blocks, each comprising a dilated one-dimensional (1D) convolution.

3. The method of claim 2, wherein the causal TCN further comprises a dense layer connected to the one or more serially connected residual blocks, and the dense layer is configured to adjust a dimension of an output of the causal TCN.

4. The method of claim 2, wherein each residual block further comprises:
 a rectified linear unit (ReLU) activation function applied in series with the dilated 1D convolution; and
 a dropout layer configured for regularization and applied after the ReLU activation function.

5. The method of claim 1, wherein processing the multichannel audio input using the neural network classifier to generate the series of classification results in the series of time windows for the multichannel audio input comprises:
 preprocessing the set of audio signals to output a combined audio signal;
 dividing the combined audio signal into a series of frames in the series of time windows; and
 for each time window, obtaining a frame that corresponds to the corresponding time window from the series of frames;

applying the frame to the neural network classifier to generate an estimation result for the corresponding time window; and determining a classification result for the corresponding time window based on the estimation result.

6. The method of claim 5, wherein applying the frame to the neural network classifier to generate the estimation result for the corresponding time window comprises:

generating a feature sequence for the frame, wherein the feature sequence includes a feature for the frame and T−1 features for T−1 previous frames, where T is a positive integer;

inputting the feature sequence to the neural network classifier to produce a value sequence, wherein the value sequence includes a value estimation for the frame and T−1 value estimations for the T−1 previous frames;

updating a value buffer based on the value sequence; and generating the estimation result for the corresponding time window based on the value buffer.

7. The method of claim 6, wherein generating the feature sequence for the frame comprises:

processing the frame using a high-pass filter;

computing a Mel-frequency spectrum for the frame; and concatenating the Mel-frequency spectrum of the frame with T−1 Mel-frequency spectra of the T−1 previous frames to generate the feature sequence.

8. The method of claim 6, wherein the value buffer includes T value estimations for the corresponding time window, and the estimation result for the corresponding time window is generated based on the T value estimations.

9. The method of claim 1, wherein processing the multichannel audio input using the neural network classifier to generate the series of classification results for the multichannel audio input comprises:

processing each audio signal using the neural network classifier to make a speech estimation from the corresponding audio signal so that a set of speech estimations is generated for the set of audio signals, wherein the set of speech estimations comprises, for each time window, a corresponding set of estimation results for the set of audio signals; and fusing the set of speech estimations for the set of audio signals to generate the series of classification results in the series of time windows for the multichannel audio input.

10. The method of claim 9, wherein processing each audio signal using the neural network classifier further comprises:

dividing each audio signal into a series of frames in the series of time windows; and for each time window,
obtaining a frame that corresponds to the corresponding time window from the series of frames; and
applying the frame to the neural network classifier to generate an estimation result for the corresponding time window.

11. The method of claim 9, wherein fusing the set of speech estimations for the set of audio signals to generate the series of classification results in the series of time windows for the multichannel audio input comprises:

fusing, for each time window, the corresponding set of estimation results to generate a classification result for the corresponding time window.

12. The method of claim 1, wherein determining whether the multichannel audio input includes one or more speech segments in the series of time windows based on the series of classification results comprises:

determining, for each time window, whether a speech segment exists in the multichannel audio input during the corresponding time window based on a classification result for the corresponding time window.

13. A system for speech detection, comprising:

a memory configured to store a multichannel audio input acquired by an audio detection array, wherein the multichannel audio input includes a set of audio signals from a set of audio channels in the audio detection array; and a processor configured to:
process the multichannel audio input using a neural network classifier to generate a series of classification results in a series of time windows for the multichannel audio input, wherein the neural network classifier comprises a causal temporal convolutional network (TCN) configured to determine a classification result for each time window based on portions of the multichannel audio input in the corresponding time window and one or more time windows before the corresponding time window; and determine whether the multichannel audio input includes one or more speech segments in the series of time windows based on the series of classification results.

14. The system of claim 13, wherein the causal TCN comprises:

one or more serially connected residual blocks, each comprising a dilated one-dimensional (1D) convolution; and a dense layer connected to the one or more serially connected residual blocks, and configured to adjust a dimension of an output of the causal TCN.

15. The system of claim 13, wherein to process the multichannel audio input using the neural network classifier to generate the series of classification results in the series of time windows, the processor is further configured to:

preprocess the set of audio signals to output a combined audio signal;

divide the combined audio signal into a series of frames in the series of time windows; and for each time window,
obtain a frame that corresponds to the corresponding time window from the series of frames;
apply the frame to the neural network classifier to generate an estimation result for the corresponding time window; and
determine a classification result for the corresponding time window based on the estimation result.

16. The system of claim 15, wherein to apply the frame to the neural network classifier to generate the estimation result for the corresponding time window, the processor is further configured to:

generate a feature sequence for the frame, wherein the feature sequence includes a feature for the frame and T−1 features for T−1 previous frames, where T is a positive integer;

input the feature sequence to the neural network classifier to produce a value sequence, wherein the value sequence includes a value estimation for the frame and T−1 value estimations for the T−1 previous frames;

update a value buffer based on the value sequence; and generate the estimation result for the corresponding time window based on the value buffer.

17. The system of claim 13, wherein to process the multichannel audio input using the neural network classifier to generate the series of classification results in the series of time windows, the processor is further configured to:
  process each audio signal using the neural network classifier to make a speech estimation from the corresponding audio signal so that a set of speech estimations is generated for the set of audio signals, wherein the set of speech estimations comprises, for each time window, a corresponding set of estimation results for the set of audio signals; and
  fuse the set of speech estimations for the set of audio signals to generate the series of classification results in the series of time windows for the multichannel audio input.

18. The system of claim 17, wherein to process each audio signal using the neural network classifier, the processor is further configured to:
  divide each audio signal into a series of frames in the series of time windows; and
  for each time window,
    obtain a frame that corresponds to the corresponding time window from the series of frames; and
    apply the frame to the neural network classifier to generate an estimation result for the corresponding time window.

19. The system of claim 17, wherein to fuse the set of speech estimations for the set of audio signals to generate the series of classification results in the series of time windows, the processor is further configured to:
  fuse, for each time window, the corresponding set of estimation results to generate a classification result for the corresponding time window.

20. A non-transitory computer-readable storage medium configured to store instructions which, in response to an execution by a processor, cause the processor to perform a process comprising:
  receiving a multichannel audio input that includes a set of audio signals from a set of audio channels in an audio detection array;
  processing the multichannel audio input using a neural network classifier to generate a series of classification results in a series of time windows for the multichannel audio input, wherein the neural network classifier comprises a causal temporal convolutional network (TCN) configured to determine a classification result for each time window based on portions of the multichannel audio input in the corresponding time window and one or more time windows before the corresponding time window; and
  determining whether the multichannel audio input includes one or more speech segments in the series of time windows based on the series of classification results.

* * * * *